(12) United States Patent
Takahama

(10) Patent No.: US 9,024,872 B2
(45) Date of Patent: May 5, 2015

(54) HEAD-MOUNTED DISPLAY

(75) Inventor: Kengo Takahama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 40 days.

(21) Appl. No.: 14/113,402

(22) PCT Filed: Apr. 23, 2012

(86) PCT No.: PCT/JP2012/060890
§ 371 (c)(1),
(2), (4) Date: Oct. 23, 2013

(87) PCT Pub. No.: WO2012/147702
PCT Pub. Date: Nov. 1, 2012

(65) Prior Publication Data
US 2014/0055353 A1    Feb. 27, 2014

(30) Foreign Application Priority Data
Apr. 28, 2011   (JP) .................. 2011-102372

(51) Int. Cl.
*G06F 3/01* (2006.01)
*H04N 13/04* (2006.01)
*G02B 27/01* (2006.01)
*H04N 13/02* (2006.01)

(52) U.S. Cl.
CPC ............... *G06F 3/011* (2013.01); *G06F 3/012* (2013.01); *G06F 3/017* (2013.01); *H04N 13/044* (2013.01); *G02B 27/017* (2013.01); *G02B 2027/0178* (2013.01); *G02B 2027/0187* (2013.01); *G02B 2027/0138* (2013.01); *G02B 2027/014* (2013.01); *H04N 13/0214* (2013.01); *H04N 13/0253* (2013.01)

(58) Field of Classification Search
CPC ......... G06F 3/012; G06F 3/017; G06F 3/011; H04N 13/044; H04N 13/0429; G02B 27/017; G02B 2027/0178
USPC ........................................................ 345/156
See application file for complete search history.

(56) References Cited

U.S. PATENT DOCUMENTS

| 2008/0106746 A1 | 5/2008 | Shpunt et al. |
| 2009/0096783 A1 | 4/2009 | Shpunt et al. |
| 2010/0177164 A1 | 7/2010 | Zalevsky et al. |

(Continued)

FOREIGN PATENT DOCUMENTS

| JP | 2009-511897 A | 3/2009 |
| JP | 2010-146481 A | 7/2010 |

OTHER PUBLICATIONS

Official Communication issued in International Patent Application No. PCT/JP2012/060890, mailed on Jul. 10, 2012.

*Primary Examiner* — Premal Patel
(74) *Attorney, Agent, or Firm* — Keating & Bennett, LLP

(57) ABSTRACT

A mounting section (2) for a user to mount on his/her head includes an infrared light irradiation section (5) that irradiates an object to be detected (21) with a predetermined pattern of infrared light and an infrared light detection section (6) that detects the infrared light reflected by the object to be detected (21). The infrared light irradiation section (5) and the infrared light detection section (6) are placed at a predetermined distance from each other. The three-dimensional coordinates of the object to be detected (21) are computed from a predetermined pattern of reflection from the object to be detected (21) as obtained by the infrared light detection section (6).

11 Claims, 20 Drawing Sheets

(56) References Cited

U.S. PATENT DOCUMENTS

| | | |
|---|---|---|
| 2011/0096182 A1 | 4/2011 | Cohen et al. |
| 2012/0019645 A1* | 1/2012 | Maltz .............................. 348/78 |
| 2012/0035934 A1* | 2/2012 | Cunningham ................ 704/260 |
| 2012/0281240 A1 | 11/2012 | Cohen et al. |

* cited by examiner

HEAD-MOUNTED DISPLAY

TECHNICAL FIELD

The present invention relates to a head-mounted display capable of computing the three-dimensional coordinates of an object to be detected.

BACKGROUND ART

In recent years, all sorts of information have been computerized along with the evolution of the Internet, and it has become common, for example, to view electronic books, various types of computerized information, etc. via portable terminals such as electronic book players and smartphones.

A portable terminal such as an electronic book player or a smartphone may be placed on a table for use, but may also be often used, for example, by a user lying in a comfortable position.

In such a case as that shown in FIG. 21 where a portable terminal 90 such as an electronic book player or a smartphone is used by a user lying in a comfortable position, the user finds himself/herself having to hold the portable terminal 90 with one hand. Moreover, in performing a predetermined input operation on the portable terminal 90, the user needs to move it closer to him/her and perform the input operation with the other hand.

This has caused such inconveniences to the user 91 that the product weight of the portable terminal 90 makes the hands of the user 91 tired and that the user 91 needs to move the portable terminal 90 closer to him/her in performing an input operation.

Under such circumstances, attention has been paid to such a head-mounted display as that described in Patent Literature 1 which includes hand position and motion detecting means.

FIG. 22 is a diagram schematically showing a configuration of a head-mounted display described in Patent Document 1 which includes hand position and motion detecting means.

As shown in FIG. 22, the head-mounted display 100 includes a head-mounted section 110, an image generating section 120, imaging devices 131 and 132, and a control section 140.

The head-mounted section 110 is in the shape of an eyeglass frame and can therefore be mounted on the head of a user.

The image generating section 120, attached to a front edge of the head-mounted section 110, generates an image and allows the user to view the image.

Moreover, the imaging devices 131 and 132, each constituted by an image sensor, an imaging optical system, or the like, are attached to front parts of the head-mounted section 110 at a certain distance from each other.

The control section 140, connected to the image generating section 120 and the imaging devices 131 and 132, controls the head-mounted display 100.

According to this configuration, the image generating section 120 generates a plurality of virtual panel images that appear to be put on top of one another in a depth direction (i.e., in a direction away from this side along the line of sight of the user, and in a case where a hand (finger) 150 of the user stays at a virtual panel for a certain period of time or longer, a command corresponding to the virtual panel is executed.

That is, by detecting the in-depth coordinates of the hand (finger) 150 of the user from images of the hand (finger) 150 of the user as obtained from the left and right imaging devices 131 and 132, the control section 140 determines whether or not the hand (finger) 150 of the user has stayed at a virtual panel for a certain period of time or longer.

Such a configuration makes it possible to achieve a device that makes it possible to both view an image of predetermined information and perform an input operation without holding a portable terminal in hand.

Further, Patent Literature 1 discloses a configuration in which a sensor 160 that detects a motion of a hand of a user (e.g., bending of a finger) is attached to the hand (finger) 150 of the user.

This configuration makes it possible to achieve a device that performs an input operation by detecting a motion of a hand of a user.

Moreover, Patent Literature 2 describes an optical mapping system that can be used for three-dimensional mapping of an object.

FIG. 23 is a diagram schematically showing the optical mapping system described in Patent Literature 2.

As shown in FIG. 23, the optical mapping system includes: an illuminating unit 212 configured to project a random speckle pattern (desirably a steady pattern) onto an object 213; and an imaging device 214.

The illuminating unit 212 includes a light source unit 212A and a steady random speckle pattern generator 212B. It is desirable that the steady random speckle pattern generator 212B be housed in an optical path of illuminating light from the light source unit 212A and be in close proximity to the light source output.

Meanwhile, the imaging device 214 includes a photodetector 214A (pixel matrix, e.g., a CCD) including an imaging lens 214B, so that reflected light from the object 213 can be detected.

Moreover, there is a control system 216 connected to the output of the imaging device 214, and the control system 216 includes a memory 216A, a processor 216B that processes and analyzes data, and an input/output device 216C (e.g., a data presenting section such as a display device).

The imaging device 214 is configured to generate image data by detecting an optical response (light reflection) in an illuminated region, and the image data represents the object 213 having a projected speckle pattern, and represents a shift in pattern on an image of the object 213 with respect to a reference image of the pattern.

This configuration is described as making it possible to reconstruct a three-dimensional map of the object 213 in real time.

CITATION LIST

Patent Literature 1

Japanese Patent Application Publication, Tokukai, No. 2010-146481 A (Publication Date: Jul. 1, 2010)

Patent Literature 2

Japanese Translation of PCT International Publication, Tokuhyohei, No. 2009-511897 A (Publication Date: Mar. 19, 2009)

SUMMARY OF INVENTION

Technical Problem

However, the configuration disclosed in Patent Literature 1 as shown in FIG. 22 is a configuration in which active illumination is not provided, and therefore has such a problem as to be incapable of detecting the position of the hand (finger) 150 of the user in a dark place such as a bedroom.

Further, since the optical mapping system disclosed in Patent Literature 2 as shown in FIG. 23 is independent of the input/output device 216C (display device) of the control system 216, the imaging device 214 of the optical mapping system cannot generate image data corresponding to a motion, if any, of the input/output device 216C (display device).

This makes it difficult for a head-mounted display, i.e., a display device whose orientation might frequently change due to a posture change in the user or the like, to detect the three-dimensional coordinates of an object by using the optical mapping system.

The present invention has been made in view of the foregoing problems, and it is an object of the present invention to provide a head-mounted display capable of computing the three-dimensional coordinates of an object to be detected even in a dark place such as a bedroom and capable of, even if a user wearing the head-mounted display moves his/her head, computing the three-dimensional coordinates of the object to be detected in accordance with the motion.

Solution to Problem

In order to solve the foregoing problems, a head-mounted display of the present invention is a head-mounted display, including a display section that allow an user to view an image, which is capable of computing three-dimensional coordinates of an object to be detected, including: a mounting section for the user to mount on his/her head, the mounting section including an infrared light irradiation section that irradiates the object to be detected with a predetermined pattern of infrared light and an infrared light detection section that detects the infrared light reflected by the object to be detected, the infrared light irradiation section and the infrared light detection section being placed at a predetermined distance from each other; and a control section including a computing section that computes the three-dimensional coordinates, the computing section computing, from a predetermined pattern of reflection from the object to be detected as obtained by the infrared light detection section, coordinate values of the object to be detected as measured along lines parallel to first and second axes that are orthogonal to each other, and computing, from an amount of shift between a predetermined pattern with which the object to be detected is irradiated and the predetermined pattern of reflection from the object to be detected as obtained by the infrared light detection section, a coordinate value of the object to be detected as measured along a line parallel to a third axis that is orthogonal to the first and second axes and parallel to a line of sight of the user.

The foregoing configuration, which includes the infrared light irradiation section and the infrared light detection section, makes it possible, even in a dark place such as a bedroom, to compute the three-dimensional coordinates of the object to be detected.

Further, the foregoing configuration, in which the mounting section for the user to mount on his/her head includes the infrared light irradiation section and the infrared light detection section, makes it possible, even if the user moves his/her head, to compute, in accordance with this movement, the three-dimensional coordinates of the object to be detected.

Therefore, the foregoing configuration can achieve a head-mounted display which makes it possible, even in a dark place such as a bedroom, to compute the three-dimensional coordinates of an object to be detected and which makes it possible, even if a user wearing the head-mounted display moves his/her head, to compute, in accordance with this movement, the three-dimensional coordinates of an object to be detected.

Advantageous Effects of Invention

As described above, a head-mounted display of the present invention includes: a mounting section for the user to mount on his/her head, the mounting section including an infrared light irradiation section that irradiates the object to be detected with a predetermined pattern of infrared light and an infrared light detection section that detects the infrared light reflected by the object to be detected, the infrared light irradiation section and the infrared light detection section being placed at a predetermined distance from each other; and a control section including a computing section that computes the three-dimensional coordinates, the computing section computing, from a predetermined pattern of reflection from the object to be detected as obtained by the infrared light detection section, coordinate values of the object to be detected as measured along lines parallel to first and second axes that are orthogonal to each other, and computing, from an amount of shift between a predetermined pattern with which the object to be detected is irradiated and the predetermined pattern of reflection from the object to be detected as obtained by the infrared light detection section, a coordinate value of the object to be detected as measured along a line parallel to a third axis that is orthogonal to the first and second axes and parallel to a line of sight of the user.

This makes it possible to achieve a head-mounted display which makes it possible, even in a dark place such as a bedroom, to compute the three-dimensional coordinates of an object to be detected and which makes it possible, even if a user wearing the head-mounted display moves his/her head, to compute, in accordance with this movement, the three-dimensional coordinates of an object to be detected.

DESCRIPTION OF EMBODIMENTS

Embodiments of the present invention are described in detail below with reference to the drawings. Note, however, that the dimensions of components described in the embodiments below, the materials therefor, the shapes thereof, and the positions thereof relative to each other are merely examples, and the scope of the present invention should not be narrowly interpreted in terms of these examples.

Note also that the embodiments below are described on, but are not limited to, the premise of a 3D head-mounted display.

Embodiment 1

Figure 1:
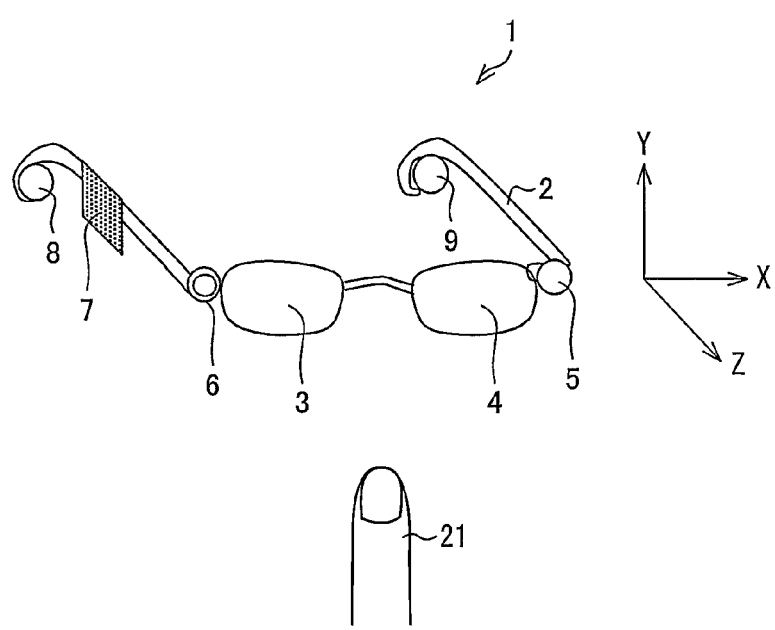
FIG. 1 is a diagram schematically showing a configuration of a head-mounted display according to Embodiment 1 of the present invention.

FIG. 1 is a diagram schematically showing a configuration of a head-mounted display 1 (HMD).

As shown in FIG. 1, the head-mounted display 1 includes a mounting section 2, a right-eye image display section 3, and a right-eye image display section 4. The mounting section 2 is in the shape of an eyeglass frame so that a user can mount the head-mounted display 1 on his/her head, and the right-eye and left-eye image display sections 3 and 4 serve as a display section that allows the user to view an image.

Moreover, the mounting section 2 is provided with an infrared light irradiation section 5 and an infrared light detection section 6. The infrared light irradiation section 5 irradiates an object to be detected 21 with a predetermined pattern of infrared light, and the infrared light detection section 6 detects the infrared light reflected by the object to be detected 21. The infrared light irradiation section 5 and the infrared light detection section 6 are placed at a predetermined distance from each other.

Furthermore, the mounting section 2 includes a control unit 7 (control section) that controls the right-eye and left-eye image display sections 3 and 4, the infrared light irradiation section 5, the infrared light detection section 6, etc., and is provided with a right-ear earphone 8 and a left-ear earphone 9. The right-ear earphone 8 is located a part (right-side temple) of the mounting section 2 that is put on the right ear of the user, and the left-ear earphone 9 is located a part (left-side temple) of the mounting section 2 that is put on the left ear of the user.

It should be noted that in FIG. 1, the rightward arrow, the upward arrow, and the arrow toward this side which is orthogonal to the rightward arrow and the upward arrow represents an x axis, a y axis, and a z axis, respectively.

Each of these components, namely the right-eye and left-eye image display sections 3 and 4, the infrared light irradiation section 5, the infrared light detection section 6, and the control unit 7, is described in more detail below with reference to FIG. 2.

(Configuration of the Right-Eye and Left-Eye Image Display Sections)

Figure 2:
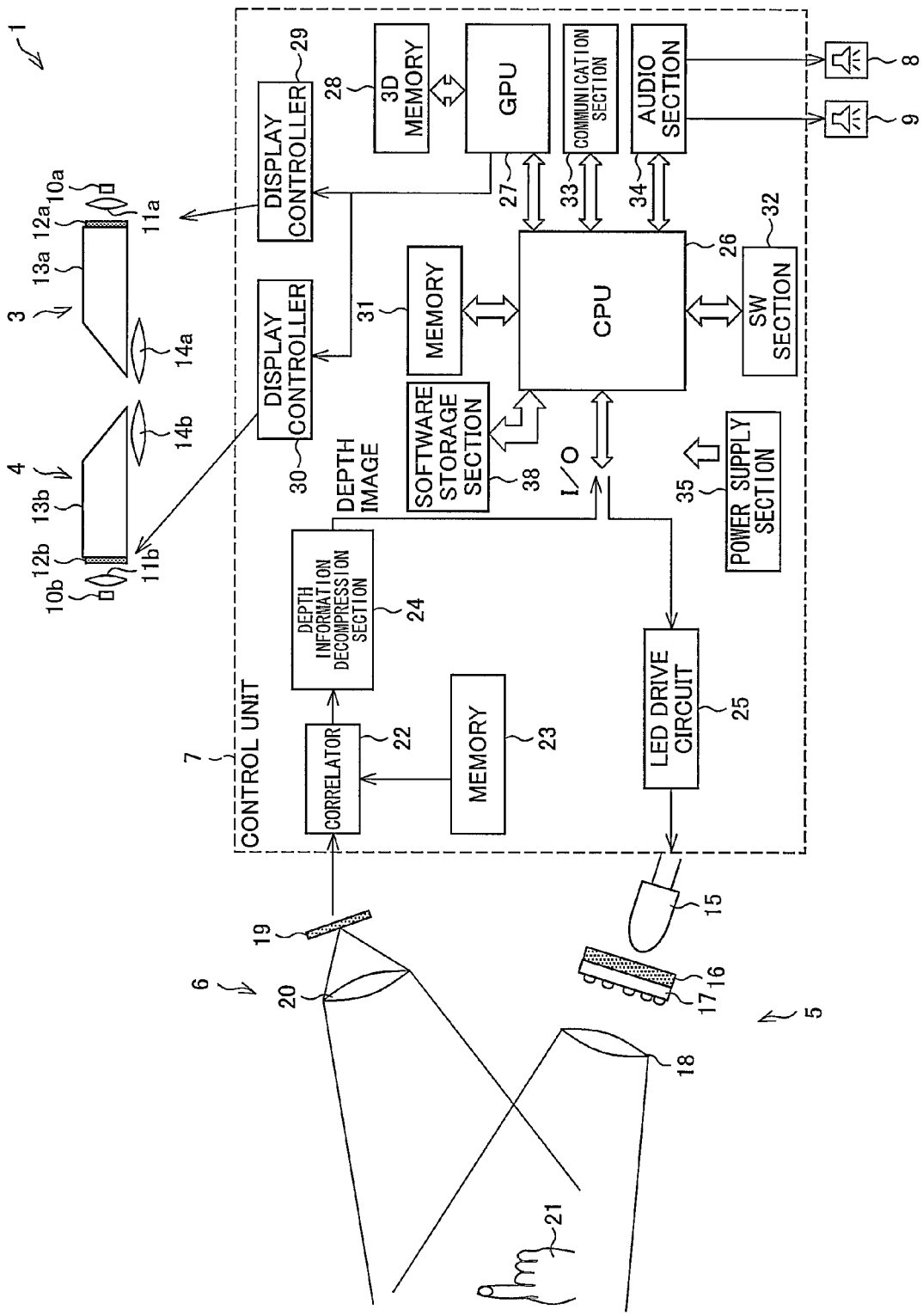
FIG. 2 is a diagram for explaining each component of the head-mounted display according to Embodiment 1 of the present invention shown in FIG. 1.

As shown in FIG. 2, the right-eye image display section 3 includes a white LED 10a serving as a backlight. Light emitted from the white LED 10a travels through a condensing lens 11a and arrives at a liquid crystal display panel 12a. The transmittance of light in each pixel of the liquid crystal display panel 12a is controlled in accordance with image data that is inputted from the after-mentioned display controller to the liquid crystal display panel 12a. Then, the light emitted from the white LED 10a travels through the liquid crystal display panel 12a, a prism 13a, and a lens 14a, and is perceived by the right eye of the user as a predetermined image.

Similarly, the left-eye image display section 4 includes a white LED 10b serving as a backlight. Light emitted from the white LED 10b travels through a condensing lens 11b and arrives at a liquid crystal display panel 12b. The transmittance of light in each pixel of the liquid crystal display panel 12b is controlled in accordance with image data that is inputted from the after-mentioned display controller to the liquid crystal display panel 12b. Then, the light emitted from the white LED 10b travels through the liquid crystal display panel 12b, a prism 13b, and a lens 14b, and is perceived by the left eye of the user as a predetermined image.

In the present embodiment, the liquid crystal display panels 12a and 12b used are high-temperature polysilicon TFT liquid crystal display panels that are commonly used in projective display devices such as projectors, and since the white LEDs 10a and 10b are used as backlights, the high-temperature polysilicon TFT liquid crystal display panels used include color filters.

This does not imply any limit on what type of liquid crystal display panel can be used in the present embodiment. Alternatively, each of the liquid crystal display panels 12a and 12b may be constituted by three high-temperature polysilicon TFT liquid crystal display panels including a red light source, a green light source, and a blue light source as backlights, respectively, and not including color filters for the respective light sources.

Alternatively, the liquid crystal display panels may be replaced by LCOS (Liquid Crystal On Silicon), organic EL displays OLEDs (organic light emitting diodes), FEDs (field emission displays), SEDs (surface-conduction electron-emitter displays), etc.

(Infrared Light Irradiation Section)

Moreover, the head-mounted display 1 includes the infrared light irradiation section 5, which irradiates, with infrared light (IR light), the object to be detected 21 (which is a finger) and a background object that is behind the object to be detected 21.

The infrared light irradiation section 5 includes an infrared light LED 15, a diffusing plate 16, a microlens array section 17, and a projecting lens 18. The diffusing plate 16 uniforms light emitted from the infrared light LED 15. The microlens array section 17 has a randomly formed dot pattern.

The light emitted from the infrared light LED 15 is uniformed by the diffusing plate 16 and travels through the microlens array section 17 and the projecting lens 18 so that the object to be detected 21 and the background object that is behind the object to be detected 21 are irradiated with a dot pattern (predetermined pattern) of infrared light.

In the present embodiment, the microlens array section 17 used is provided with a random dot pattern, but there is no particular limit on what type of pattern the microlens array section 17 is provided with.

(Infrared Light Detection Section)

Moreover, as shown in FIG. 2, the head-mounted display 1 includes the infrared light detection section 6, which is an infrared light camera to detect infrared light reflected from the object to be detected 21 and the background object that is behind the object to be detected 21.

In the present embodiment, the infrared light detection section 6 used is, but is not limited to, an infrared light camera including (i) a CCD 19 including a two-dimensional arrangement of light-receiving elements and having infrared light filters that selectively allow only light in an infrared light region to travel therethrough and (ii) a condensing lens 20. Alternatively, the infrared light detection section 6 used may be, for example, an infrared light camera including a CMOS, a phototransistor, or the like having a two-dimensional arrangement of light-receiving elements, provided that the light-receiving elements have sensitivity to the infrared light region.

(Control Unit)

As shown in FIG. 2, the control unit 7 includes a correlator 22. The correlator 22 receives image data obtained by digitalizing an image signal obtained in the infrared light detection section 6 and image data of a reference pattern (random dot pattern of the microlens array section 17) from a memory 23.

The correlator 22 applies the principle of triangulation, which will be described in detail later, to take pattern matching between the image data inputted from the infrared light detection section 6 and the reference-pattern image data inputted from the memory 23, thereby utilizing the occurrence of a positional shift in pattern from an original position on the infrared light camera depending on the magnitude of depth.

That is, the correlator 22 shifts, by a predetermined amount, either the image data inputted from the infrared light detection section 6 and the reference-pattern image data inputted from the memory 23 and, at the same time, performs a correlated calculation with the other data, thereby finding a shift amount at which the correlation value is an extreme value.

In the present embodiment, the correlated calculation is performed in units of small blocks of pixels. However, this does not imply any limitation.

Moreover, the control unit 7 includes a depth information decompression section 24. The depth information decompression section 24 computes depth information (coordinate value as measured along a line parallel to the z axis, which is parallel to the line of sight of the user of the head-mounted display 1) on the object to be detected 21 and the background object that is behind the object to be detected 21 in accordance with the shift amount found by the correlator 22, and supplies the depth information to a CPU 26.

That is, the correlator 22 supplies the depth information decompression section 24 with the image data inputted from the infrared light detection section 6 as well as the depth information, and the depth information decompression section 24 generates image data by adding the depth information to each of the items of image data and supplies the image data thus generated to the CPU 26.

The control unit 7 includes an LED drive circuit 25 which is controlled by the CPU 26 and which drives the infrared light LED 15.

A method for obtaining such depth information by taking pattern matching between items of data is described in detail below with reference to FIGS. 3, 4, and 5.

Figure 3:
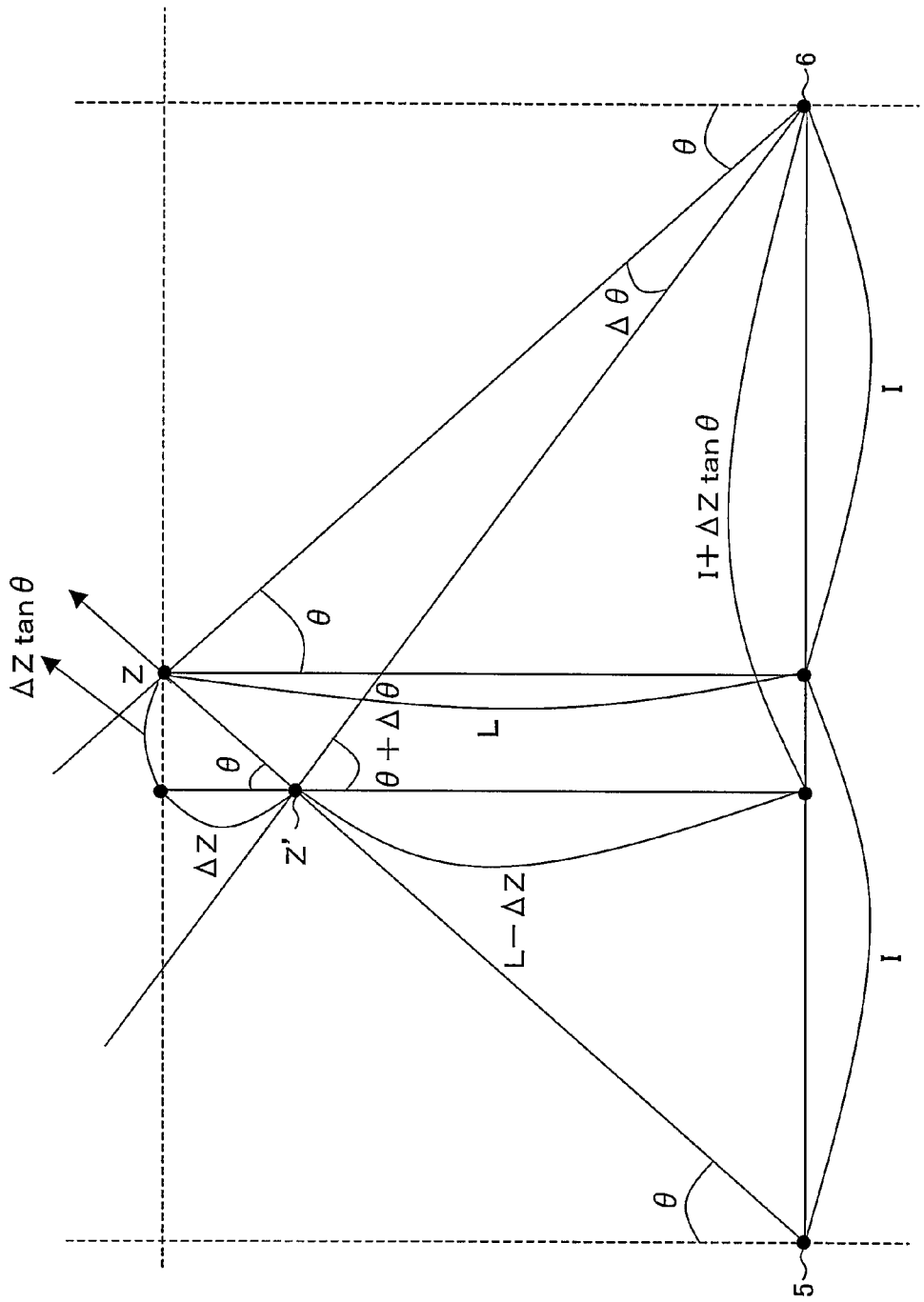
FIG. 3 is a diagram for explaining a method by which the head-mounted display according to Embodiment 1 of the present invention obtains depth information in accordance with the principle of triangulation.
Figure 4:
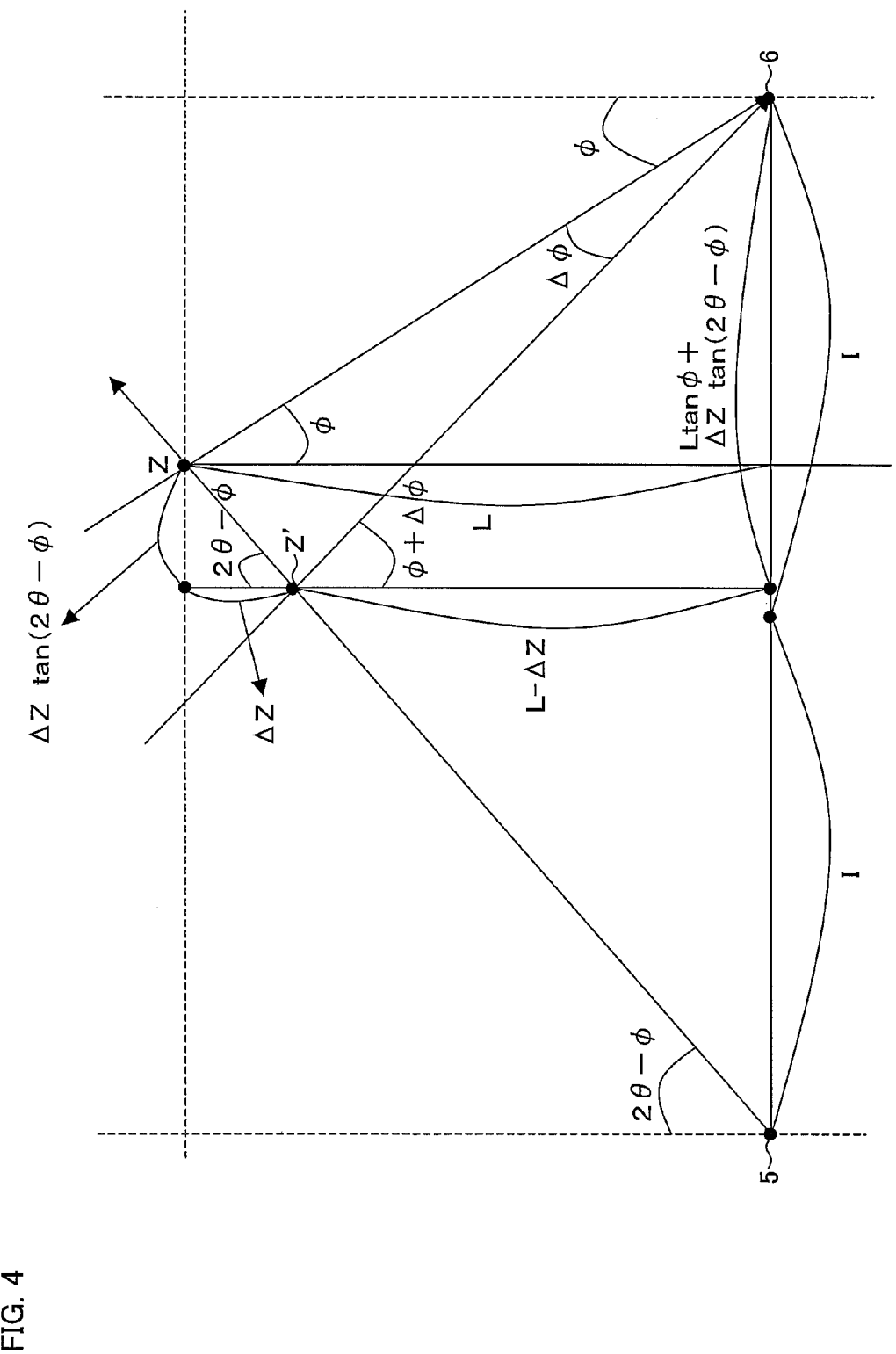
FIG. 4 is a diagram for explaining a method by which the head-mounted display according to Embodiment 1 of the present invention obtains depth information in accordance with the principle of triangulation.

FIGS. 3 and 4 are each a diagram for explaining a method by which the head-mounted display 1 obtains such depth information by employing the principle of triangulation.

FIG. 3 is a diagram for explaining a method for obtaining depth information on an object to be detected, if any, present on a path of infrared light emitted from a pattern inclined at θ rightward from the center, among the pattern of dots provided in the microlens array section (not illustrated) of the infrared light irradiation section 5.

As shown in FIG. 3, the center line of the band of infrared light emitted from one dot pattern of the infrared light irradiation section 5 is inclined at θ rightward, and the center line of the infrared light camera, i.e., the infrared light detection section 6, along the front direction is inclined at θ leftward.

Let it be assumed that the point of intersection Z (which is away from a straight line connecting the infrared light irradiation section 5 with the infrared light detection section 6 by a distance L at the shortest) between the infrared light emitted from the predetermined dot pattern of the infrared light irradiation section 5 and the center of the infrared light camera, i.e., the infrared light detection section 6, is a point of reference on the z axis, which is parallel to the line of sight of the user of the head-mounted display 1.

When the object to be detected is located at the point of intersection Z, i.e., the point of reference, (i) a dot pattern near a pattern, inclined at θ rightward from the center, with which the object to be detected is irradiated and (ii) a dot pattern near a pattern corresponding to a pattern, inclined at θ rightward from the center, which is reflected by the object to be detected and obtained by the infrared light camera, i.e., the infrared light detection section 6, become identical to each other, and as such, do not shift from the center.

Meanwhile, when the object to be detected is located at a position Z', which is toward the infrared light irradiation section 5 from the center and closer to this side than the point of intersection Z by ΔZ, Expression (1) holds as follows:

[Math. 1]

$$(L-\Delta Z)\tan(\theta+\Delta\theta)=I+\Delta Z\tan\theta \quad (1)$$

Then, simplifying Expression (1) under ΔZ gives Expression (2) as follows:

[Math. 2]

$$\Delta Z = \frac{L\tan(\theta + \Delta\theta) - I}{\tan(\theta + \Delta\theta) + \tan\theta} \quad (2)$$

where θ is a set value that is defined by how the infrared light irradiation section 5 and the infrared light detection section 6 are provided, Δθ is obtained by the after-mentioned pattern matching between the items of data, I is the half value of the distance between the infrared light irradiation section 5 and the infrared light detection section 6, and L can be found from I/tan θ. Therefore, use of Expression (2) gives depth information ΔZ (coordinate value as measured along a line parallel to the z axis, which is parallel to the line of sight of the user of the head-mounted display 1) on the object to be detected.

FIG. 4 is a diagram for explaining a method for obtaining depth information on an object to be detected, if any, present on a path of infrared light emitted from a pattern inclined at 2θ−φ rightward from the center, among the pattern of dos provided in the microlens array section (not illustrated) of the infrared light irradiation section 5.

As shown in FIG. 4, the center line of the band of infrared light emitted from one dot pattern of the infrared light irradiation section 5 is inclined at 2θ−φ rightward, and the center line of the infrared light camera, i.e., the infrared light detection section 6, along the front direction is inclined at 2θ−φ leftward.

Let it be assumed that the point of intersection Z (which is away from a straight line connecting the infrared light irradiation section 5 with the infrared light detection section 6 by a distance L at the shortest) between the infrared light emitted from the predetermined dot pattern of the infrared light irradiation section 5 and the center of the infrared light camera, i.e., the infrared light detection section 6, is a point of reference on the z axis, which is parallel to the line of sight of the user of the head-mounted display 1.

When the object to be detected is located at the point of intersection Z, i.e., the point of reference, (i) a dot pattern near a pattern, inclined at 2θ−φ rightward from the center, with which the object to be detected is irradiated and (ii) a dot pattern near a pattern corresponding to a pattern, inclined at 2θ−φ rightward from the center, which is reflected by the object to be detected and obtained by the infrared light camera, i.e., the infrared light detection section 6, shift by θ−φ from the center.

Meanwhile, when the object to be detected is located at a position Z', which is toward the infrared light detection section 6 from the center and closer to this side than the point of intersection Z by ΔZ, Expression (3) holds as follows:

[Math. 3]

$$(L-\Delta Z)\tan(\phi+\Delta\phi)=L\tan\phi+\Delta Z\tan(2\theta-\phi) \quad (3)$$

Then, simplifying Expression (3) under ΔZ gives Expression (4) as follows:

[Math. 4]

$$\Delta Z = \frac{L\tan(\phi + \Delta\phi) - L\tan\phi}{\tan(2\theta - \phi) + \tan(\phi + \Delta\phi)} \quad (4)$$

where 2θ-θ is a set value that is defined by how the infrared light irradiation section 5 is provided, φ is a set value that is defined by how the infrared light detection section 6 is provided, Δφ is obtained by the after-mentioned pattern matching between the items of data, I is the half value of the distance between the infrared light irradiation section 5 and the infrared light detection section 6, and L can be found from (tan φ+tan(2θ−φ)). Therefore, use of Expression (4) gives depth information ΔZ (coordinate value as measured along a line parallel to the z axis, which is parallel to the line of sight of the user of the head-mounted display 1) on the object to be detected.

Figure 5:
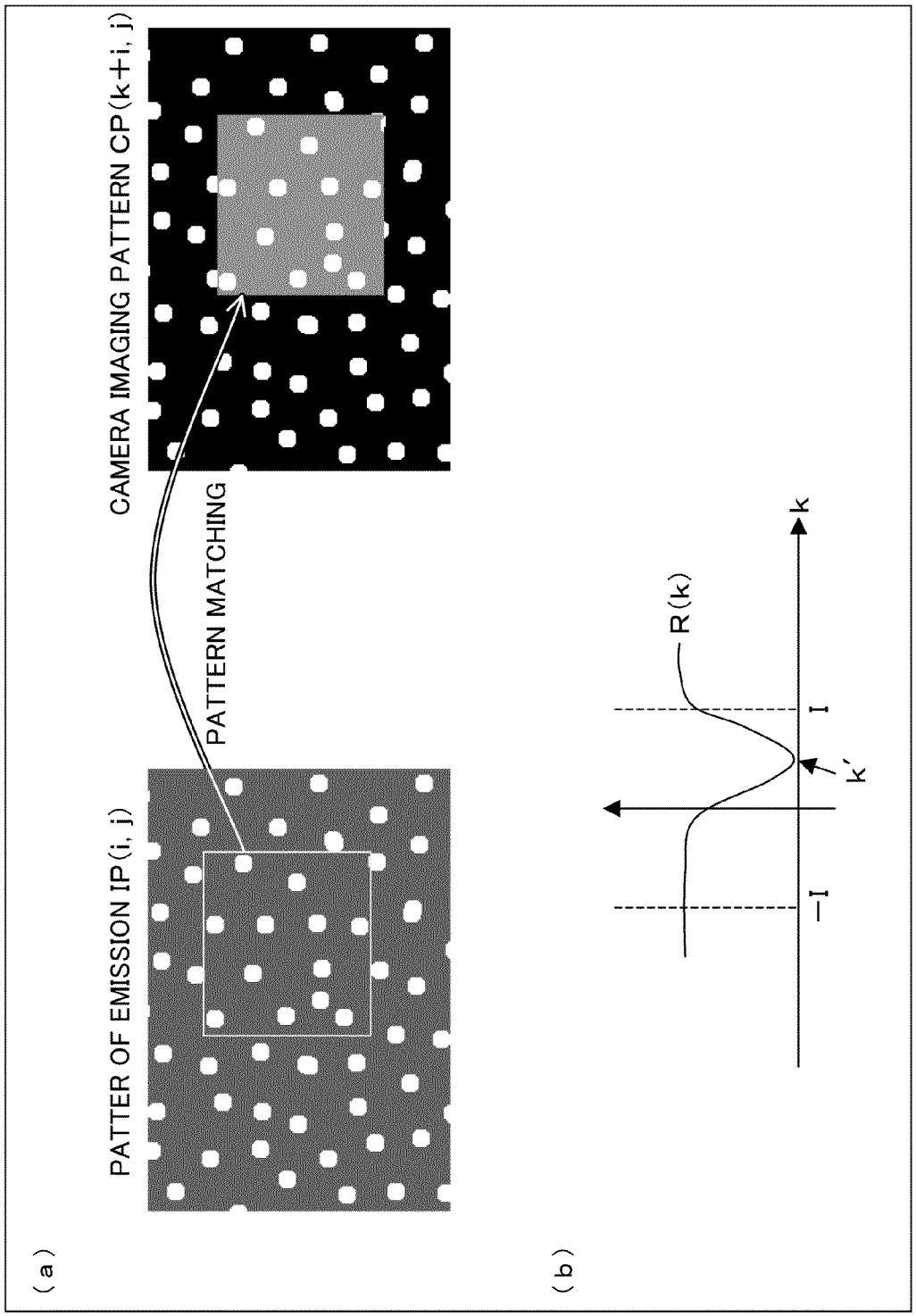
FIG. 5 is a set of diagrams for explaining a pattern matching method that is employed by the head-mounted display according to Embodiment 1 of the present invention.

FIG. 5 is a set of diagrams for explaining a pattern matching method that is employed to find Δφ.

Shown on the left and right sides of (a) of FIG. 5 are a dot pattern IP(i,j) emitted from the infrared light irradiation section 5 onto an object to be detected and a camera imaging pattern CP(k+i,j) reflected by the object to be detected and obtained by the infrared light camera, i.e., the infrared light detection section 6, respectively.

Moreover, by, as shown in FIG. 5, shifting a predetermined region, which serves as a reference, of the dot pattern IP(i,j) emitted from the infrared light irradiation section 5 rightward and leftward with respect to the imaging pattern CP(k+i,j) obtained by the infrared light camera, i.e., the infrared light detection section 6, that is, by varying the value k, the correlation value R(k) is found by Expression (5) as follows:

[Math. 5]

$$R(k) = \sum_{i=1}^{m}\sum_{j=1}^{n}(CP(k+i,j) - IP(i,j))^2 \, (k = -I \sim +I) \quad (5)$$

Since, in the present embodiment, the calculation is performed in units of small blocks of pixels, the correlation value R(k) is found by using, as a reference, the predetermined region of the dot pattern IP(i,j) emitted from the infrared light irradiation section 5 and shifting the predetermined region rightward and leftward with respect to the imaging pattern CP(k+i,j). Alternatively, the correlation value R(k) may be found by using a predetermined region of the imaging pattern CP(k+i,j) as a reference and shifting the predetermined region rightward and leftward with respect to the dot pattern IP(i,j) emitted from the infrared light irradiation section 5.

As shown in (b) of FIG. 5, k=k', where the correlation between the dot pattern IP(i,j) emitted from the infrared light irradiation section 5 and the imaging pattern CP(k+i,j) is the strongest, i.e., where the correlation value R(k) is the smallest value, is found while varying the value k within the range of −I to +I. The value k' corresponds to the aforementioned value Δθ or Δφ.

This is how the depth information ΔZ on the object to be detected 21 and the background object that is behind the object to be detected 21 can be obtained.

Moreover, as shown in FIG. 2, the CPU 26 divides the image data obtained by adding the depth information ΔZ and supplied from the depth information decompression section 24 into (i) short-distance image data on the area within a short distance of less than approximately 1 m and (ii) long-distance image data on the area at a long distance of approximately 1 m or more.

That part of the depth image data which has been divided therefrom as the short-distance image data is used for detection of an input operation on the head-mounted display 1, and that part of the depth image data which has been divided therefrom as the long-distance image data is displayed as background images by the right-eye and left-eye image display sections 3 and 4 of the head-mounted display 1.

Figure 6:
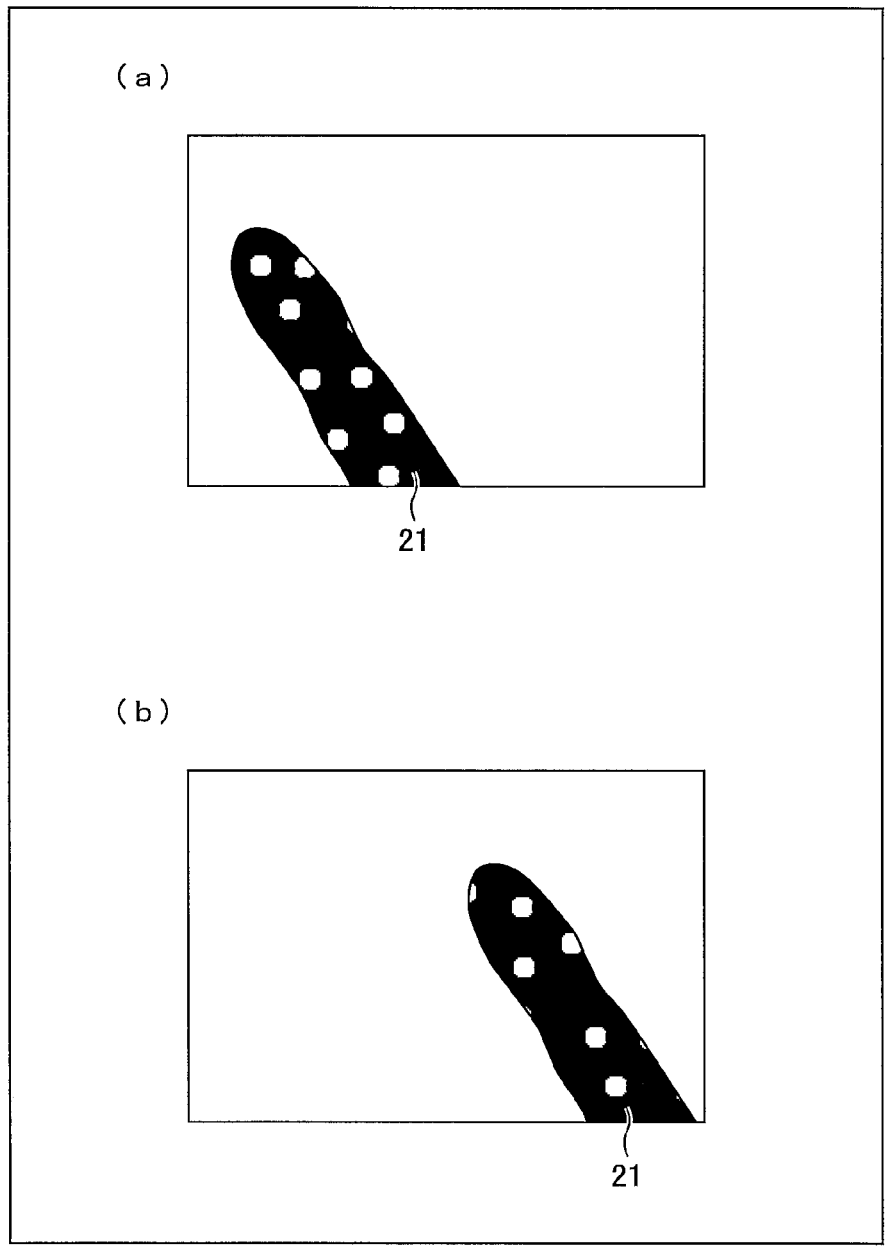
FIG. 6 is a set of diagrams for explaining a principle in accordance with which the head-mounted display according to Embodiment 1 of the present invention finds the x-axis and y-axis coordinates of an object to be detected, if any, located at a short distance.

FIG. 6 is a set of diagrams for explaining a principle for finding the x-axis and y-axis coordinates of a finger as an object to be detected 21, if any, located at a short distance of less than approximately 1 m from the head-mounted display 1.

(a) and (b) of FIG. 6 shows imaging patterns obtained by the infrared light camera, i.e., the infrared light detection section 6, to detect those portions of a dot pattern emitted from the infrared light irradiation section 5 which are reflected only by a finger in different positions, respectively. Let it be assumed in (a) and (b) of FIG. 6 that a background object is so distant that it cannot be detected by the infrared light detection section 6.

Therefore, it is only necessary to find the x-axis (which extends horizontally in the drawing) and y-axis (which extends perpendicularly in the drawing) coordinates of those portions of a dot pattern which correspond to places where the finger is present.

Further, it is also possible to similarly find the x-axis and y-axis coordinates of an object to be detected 21, if any, located at a long distance of approximately 1 m or more from the head-mounted display 1.

The control unit 7 includes a GPU 27 configured to create an image representing a profile line of the object to be detected 21 in accordance with depth image data composed of a dot pattern divided as the long-distance image data sent from the CPU 26, supply the image to the display controllers 29 and 30, and cause the image to be displayed by the right-eye and left-eye image display sections 3 and 4 as a background image.

In the creation of an image representing a profile line of the object to be detected 21, the depth image data composed of a dot pattern divided as the long-distance image data is represented by discrete values. Therefore, in order for a profile line to be obtained, it is necessary that the degree of discreteness of the discrete values be equal to or less than step resolving power. However, in a case where the degree of discreteness of the discrete values is greater than the step resolving power, profile lines pitched at an equal distance in the depth direction can be obtained by linear interpolation or the like.

Similarly, the GPU 27 creates another image representing a profile line of the object to be detected 21, such as a finger, in accordance with depth image data composed of a dot pattern divided as the short-distance image data sent from the CPU 26 and sends the image data to the CPU 26.

Figure 7:
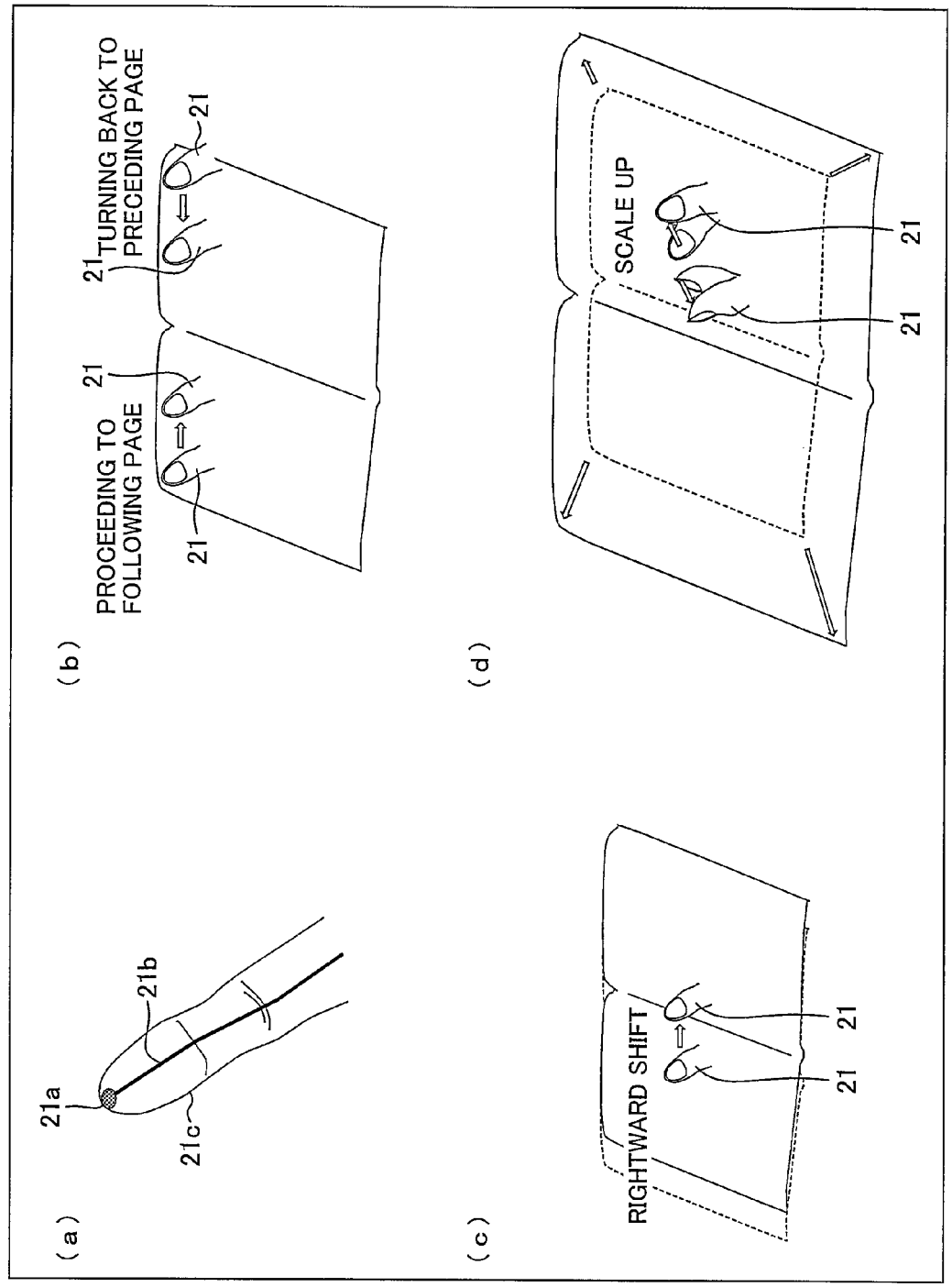
FIG. 7 is a set of diagrams showing examples of input operations that can be performed through the head-mounted display according to Embodiment 1 of the present invention.

Then, as shown in (a) of FIG. 7, the CPU 26 can find the X, Y, and Z coordinates of a tip 21a of the finger by fitting, in the image indicative of a profile line 21c of the finger, data regarding a finger skeletal model 21b stored in a memory 31.

The use of a finger skeletal mode to find the X, Y, and Z coordinates of a tip of a finger makes it possible to perform input operations through the head-mounted display 1 with a higher degree of accuracy. Examples of such input operations will be described later.

Further, a content image, such as an electronic book, obtained via the communication section 33 is sent to the GPU 27 via the CPU 26. The GPU 27 creates images for 3D (right-eye and left-eye images). The images for 3D are stored in a 3D memory 28 as needed, and are then supplied to the display controllers 29 and 30.

This is how to make the user of the head-mounted display 1 perceive a content image such as an electronic book as a stereoscopic image (3D image).

It is also possible to use a content image, such as an electronic book, stored in advance in the memory 31.

Moreover, as shown in FIG. 2, the control unit 7 includes a SW section 32 (switch section) and a software storage section 38. The SW section 32, connected to the CPU 26, includes operation switches such a power switch, a mode set switch, and other operation switches. The software storage section 38, connected to the CPU 26, has various types of software stored therein.

The software storage section 38 has coordinate detection algorithms etc. stored therein.

The control unit 7 includes an audio section 34. The audio section 34 analyzes audio data obtained via the communication section 33 and audio data inputted via a microphone (not illustrated) of the head-mounted display 1, and outputs the audio data via the earphones 8 and 9.

The control unit 7 includes a power supply section 35 configured to supply power to each component of the control unit 7.

(b), (c), and (d) of FIG. 7 are diagrams showing specific examples of input operations.

These input operations can be achieved by performing several types of gesture recognition according to a pattern of temporal changes in the coordinates of an object to be detected 21 such as the tip of a finger.

(b) of FIG. 7 shows a case where a motion of a finger from left to right in the vicinity of the upper left portion of a virtual book displayed as a content image is recognized as a gesture of proceeding to a following page, so that an image of the following page is displayed together with an image of the virtual book with a page being turned and a case where a motion of a finger from right to left in the vicinity of the upper right portion of the virtual book is recognized as a gesture of turning back to a preceding page, so that an image of the preceding page is displayed together with an image of the virtual book with a page being turned.

(c) of FIG. 7 shows a case where a motion of a finger from left to right in the vicinity of the central portion of the virtual book causes the virtual book to move to the right within initial background coordinates.

Further, (d) of FIG. 7 shows a case where an operation of moving a thumb and an index finger away from each other on the virtual book causes the virtual book to be scaled up centered at the coordinates of a midpoint between the thumb and the index finger.

On the other hand, although not illustrated, moving the thumb and the index finger closer to each other on the virtual book causes the virtual book to be scaled down.

These input operations do not imply any limitation. For example, as shown in FIG. 8, an input operation can be performed by the presence or absence of an object to be detected 21, such as a finger, touching the virtual book.

Figure 8:
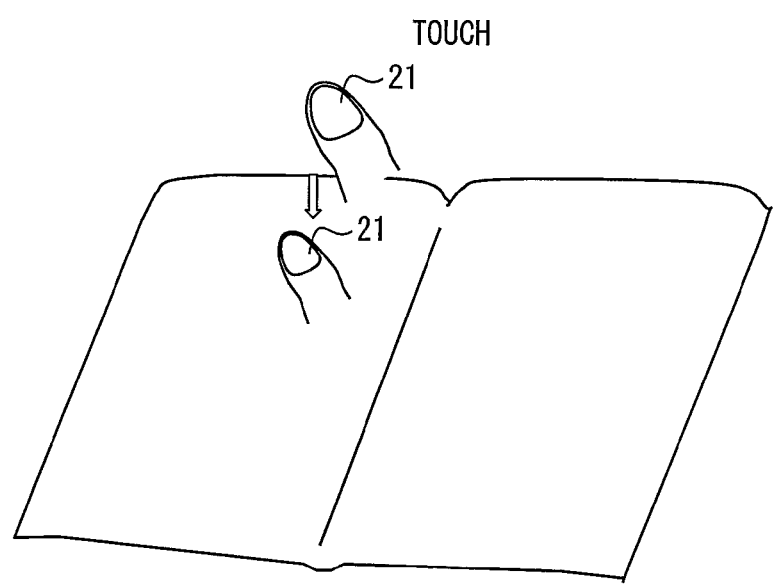
FIG. 8 is a diagram showing another example of an input operation that can be performed through the head-mounted display according to Embodiment 1 of the present invention.

In FIG. 8, it is along a line parallel to the z axis that the finger, which is an object to be detected 21, moves closer to the virtual book.

Figure 9:
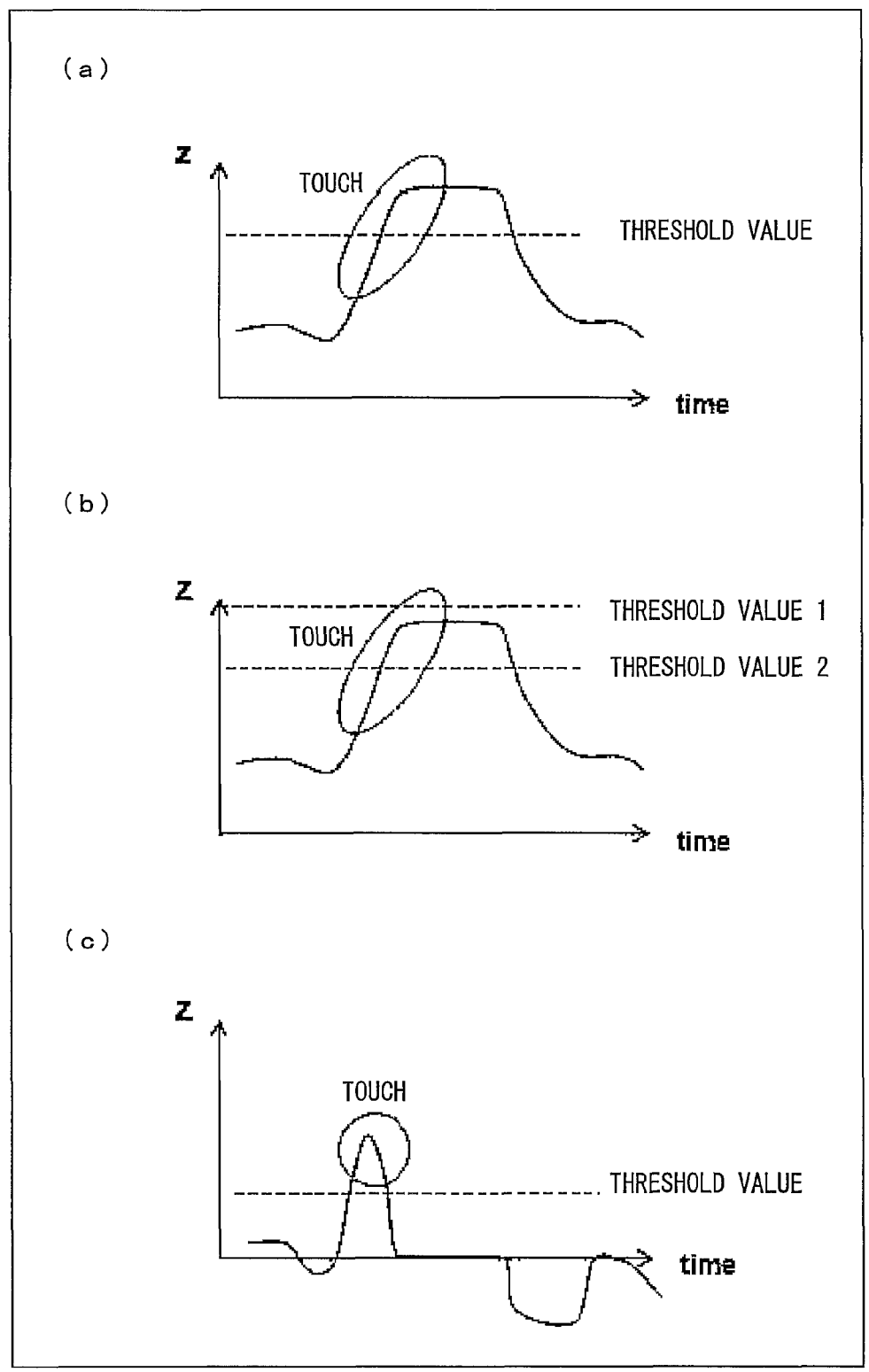
FIG. 9 is a set of diagrams showing examples of methods for determining whether or not the input operation shown in FIG. 8 has been performed.

FIG. 9 is a set of diagrams showing examples of methods for determining the presence or absence of a touch of a finger i.e., an object to be detected 21, on a virtual book in accordance with the z-axis coordinate of the tip of the finger.

(a) of FIG. 9 shows a temporal change in the z-axis coordinate of the tip of the finger, i.e., the object to be detected 21, and shows a method for determining the presence of a touch of the finger on the virtual book in a case where the z-axis coordinate is equal to or greater than a predetermined threshold value.

That is, this method determines the presence of a touch when the tip of the finger is away from the head-mounted display 1 by the threshold value or greater.

It should be noted that the threshold value can be set as appropriate according to the z-axis coordinate on which the virtual book is displayed.

Further, (b) of FIG. 9 shows a temporal change in the z-axis coordinate of the tip of the finger, i.e., the object to be detected 21, and shows a method for determining the presence of a touch of the finger on the virtual book in a case where the z-axis coordinate stays between two predetermined thresholds 1 and 2 for a predetermined period of time.

Further, (c) of FIG. 9 shows a method for determining the presence of a touch of the finger on the virtual book in a case where a value obtained by time-differentiating the z-axis coordinate of the tip of the finger, i.e., the object to be detected 21, is equal to or greater than a predetermined threshold value for a predetermined period of time.

It should be noted that the heat-mounted display 1 is not limited to the methods for determining the presence or absence of a touch of a finger on a virtual book as shown in FIG. 9, but may for example use a combination of the method of (a) of FIG. 9 and the method of (c) of FIG. 9 or a combination of the method of (b) of FIG. 9 and the method of (c) of FIG. 9.

Further, as will be described later, the CPU 26 can compute the amount of posture change in the user of the head-mounted display 1 during n frames and thereby cause a virtual book, i.e., a content image, to be displayed according to the amount of posture change in the user.

Assuming that $\theta$, $\phi$, and $\gamma$ represent rotations of the X, Y, and Z axes, respectively, and X, Y, and Z represent translation of the X, Y, and Z axes, respectively, the rotation matrices $Rx(\theta)$, $Ry(\phi)$, and $Rz(\gamma)$ and the translation matrix $T(X,Y,Z)$ can be represented by Expressions (6) to (9) as follows:

[Math. 6]

$$Rx(\theta) = \begin{bmatrix} 1 & 0 & 0 & 0 \\ 0 & Cos(\theta) & Sin(\theta) & 0 \\ 0 & -Sin(\theta) & Cos(\theta) & 0 \\ 0 & 0 & 0 & 1 \end{bmatrix} \quad (6)$$

[Math. 7]

$$Ry(\phi) = \begin{bmatrix} Cos(\theta) & 0 & -Sin(\theta) & 0 \\ 0 & 1 & 0 & 0 \\ Sin(\theta) & 0 & Cos(\theta) & 0 \\ 0 & 0 & 0 & 1 \end{bmatrix} \quad (7)$$

[Math. 8]

$$Rz(y) = \begin{bmatrix} Cos(\theta) & Sin(\theta) & 0 & 0 \\ -Sin(\theta) & Cos(\theta) & 0 & 0 \\ 0 & 0 & 1 & 0 \\ 0 & 0 & 0 & 1 \end{bmatrix} \quad (8)$$

[Math. 9]

$$T(X, Y, Z) = \begin{bmatrix} 1 & 0 & 0 & 0 \\ 0 & 1 & 0 & 0 \\ 0 & 0 & 0 & 0 \\ X & Y & Z & 1 \end{bmatrix} \quad (9)$$

According to Expression (10) below, an initial background image [xyz] is expressed by (xi,yi,z0(xi,yi)) and a background image after n frames [x',y',z'] is expressed by (xi,yi, zn(xi,yi)). Therefore, the amount of posture change $Rx(\theta)Ry(\phi)Rz(\gamma)T(X,Y,Z)$ in the user of the head-mounted display 1 during the n frames can be back-calculated.

[Math. 10]

$$[x'y'z'] = [xyz]Rx(\theta)Ry(\phi)Rz(\gamma)T(X,Y,Z) \quad (10)$$

Then, assuming that $M(\theta,\phi,\gamma,X,Y,Z)$ is the inverse matrix of the amount of posture change $Rx(\theta)Ry(\phi)Rz(\gamma)T(X,Y,Z)$ in the user of the head-mounted display 1 during the n frames, Expression (11) holds as follows:

[Math. 11]

$$[x'y'z']M(\theta,\phi,\gamma,X,Y,Z)[xyz] \quad (11)$$

In a case where a predetermined background image, e.g., an initial background image, is always displayed on the right-eye and left-eye image display sections 3 and 4 of the head-mounted display 1, a mode (tool-mounted mode) in which only a virtual book, i.e., a content image follows as much as the user changed his/her posture can be achieved by displaying the background images while transforming the initial coordinate value of the virtual book by the amount of posture change $Rx(\theta)Ry(\phi)Rz(\gamma)T(X,Y,Z)$ in the user.

Meanwhile, in a case where a background image that continuously changes as the user changes his/her posture is displayed on the right-eye and left-eye image display sections 3 and 4 of the head-mounted display 1, it is possible, with use of the inverse matrix $M(\theta,\phi,\gamma,X,Y,Z)$ of the amount of posture change $Rx(\theta)Ry(\phi)Rz(\gamma)T(X,Y,Z)$ in the user, to cause only a virtual book, i.e., a content image, to be displayed with the virtual image fixed at its initial coordinate value. This makes it possible to achieve a mode (MR mode; Mixed Reality mode) in which while the background image continuously changes as the user changes his/her posture, the virtual book, i.e., the content image appears to be placed in a predetermined location.

The head-mounted display 1 allows the user to choose between the tool-mounted mode and the MR mode.

Figure 10:
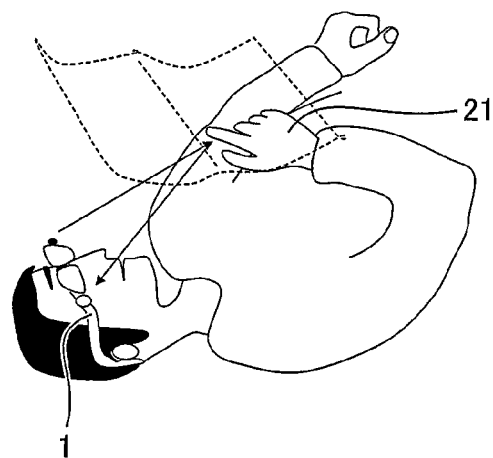
FIG. 10 is a diagram showing how the head-mounted display according to Embodiment 1 of the present invention is used.

As shown in FIG. 10, a user wearing the head-mounted display 1 can view an image of predetermined information while lying in a comfortable position and can perform an input operation even in a dark place such as a bedroom.

Embodiment 2

A second embodiment of the present invention is described below with reference to FIGS. 11 through 20. A head-mounted display 1a of the present embodiment differs from Embodiment 1 in that in order to further improve a sense of reality, the head-mounted display 1a includes a right-eye imaging device 36 and a left-eye imaging device 37 for capturing a background image as a color image, and the other components of the head-mounted display 1a are the same as those described in Embodiment 1. For convenience of explanation, members having the same functions as those shown in the drawings of Embodiment 1 are given the same reference signs, and as such, are not described below.

Figure 11:
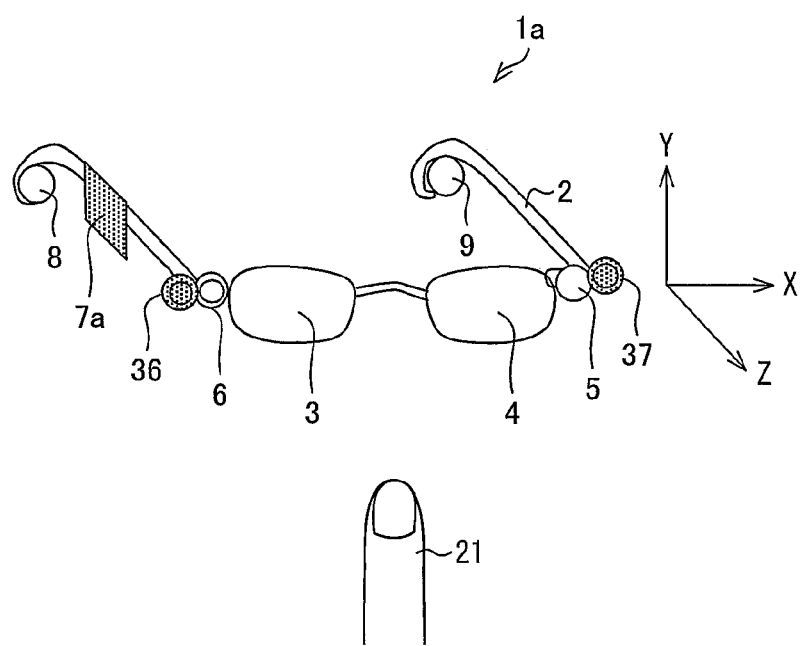
FIG. 11 is a diagram schematically showing a configuration of a head-mounted display according to Embodiment 2 of the present invention.

FIG. 11 is a diagram schematically showing a configuration of the head-mounted display 1 including the right-eye imaging device 36 (color camera) and the left-eye imaging device 37 (color camera).

As shown in FIG. 11, the right-eye imaging device 36 and the left-eye imaging device 37 are provided in the mounting section 2 of the head-mounted display 1a in such a manner as to be located in a place adjacent to the infrared light detection section 6 and a place adjacent to the infrared light irradiation section 5, respectively.

Moreover, the right-eye imaging device 36 and the left-eye imaging device 37 are placed at a predetermined distance from each other so as to be able to capture a right-eye image and a left-eye image with binocular parallax.

Figure 12:
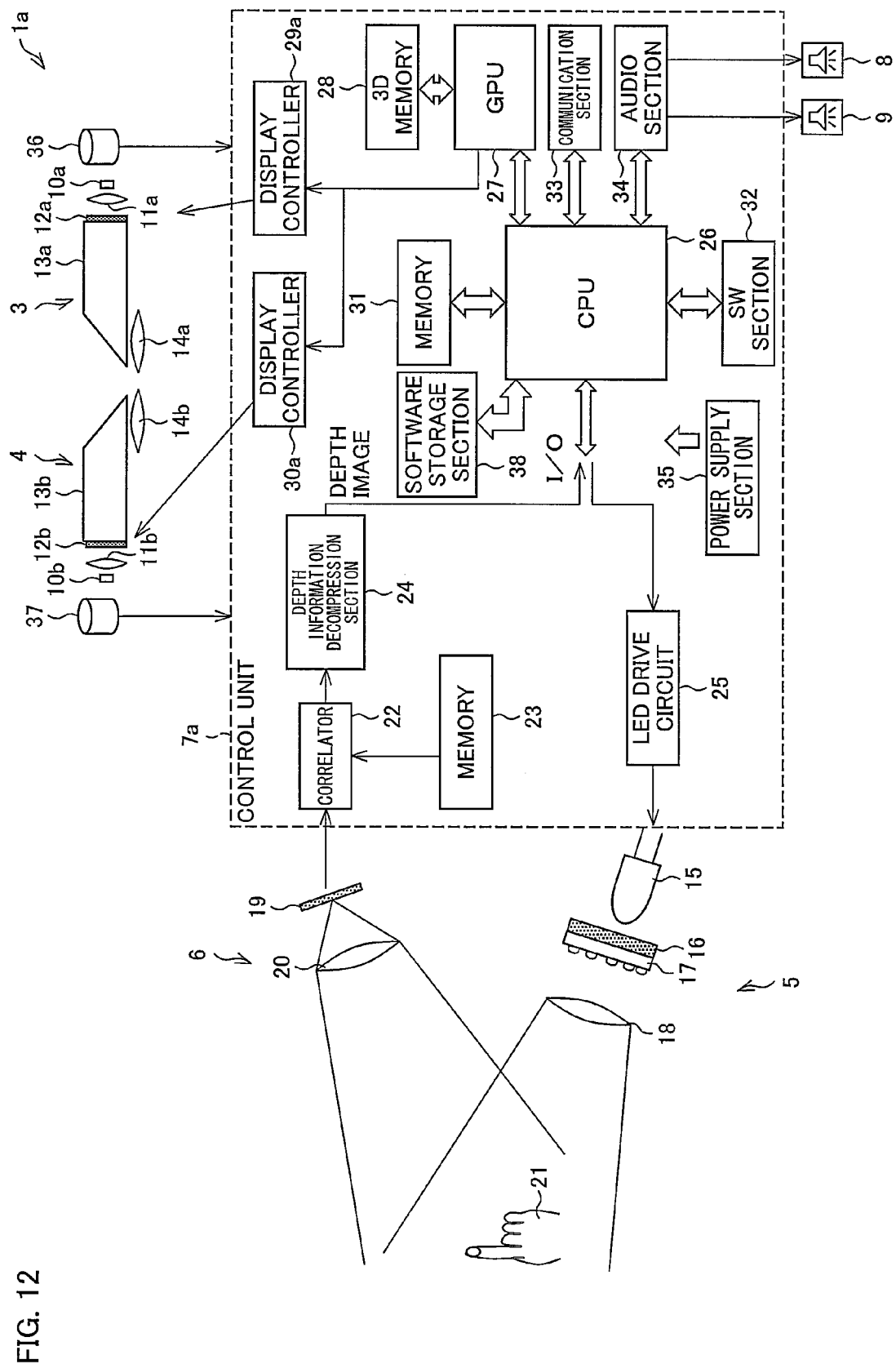
FIG. 12 is a diagram for explaining each component of the head-mounted display according to Embodiment 2 of the present invention shown in FIG. 11.

FIG. 12 is a diagram for explaining each component of the head-mounted display 1*a*.

As shown in FIG. 12, a right-eye color image imported from the right-eye imaging device 36 and a left-eye color image imported from the left-eye imaging device 37 are stored in the 3D memory 28 of the control unit 7*a*, and the CPU 26 computes depth information on these right-eye and left-eye color images from these right-eye and left-eye color images by using a phase-limited correlation method, which will be described in detail later.

Then, on the basis of the depth information on the background image as computed by the CPU 26, the GPU 27 creates a right-eye color image by transparently superimposing, on the right-eye color image of the background image, a right-eye color image of a content image such as a virtual book or a virtual shrine created by the GPU 27 as an image for 3D, so that the right-eye color image of the content image is located closer to this side than the right-eye color image of the background image. Then, the GPU 27 supplies the right-eye color image thus created to the display controller 29*a*.

Similarly, on the basis of the depth information on the background image as computed by the CPU 26, the GPU 27 creates a left-eye color image by transparently superimposing, on the left-eye color image of the background image, a left-eye color image of the content image such as a virtual book or a virtual shrine created by the GPU 27 as an image for 3D, so that the left-eye color image of the content image is located closer to this side than the left-eye color image of the background image. Then, the GPU 27 supplies the left-eye color image thus created to the display controller 30*a*.

This allows a user of the head-mounted display 1*a* to perceive the content image such as a virtual image or a virtual shrine as being located closer to this side than the background image.

Instead of employing the transparent superimposing method, it is possible to employ such a method that only the content image is preferentially seen in a part where the content image and the background image overlap.

Figure 13:
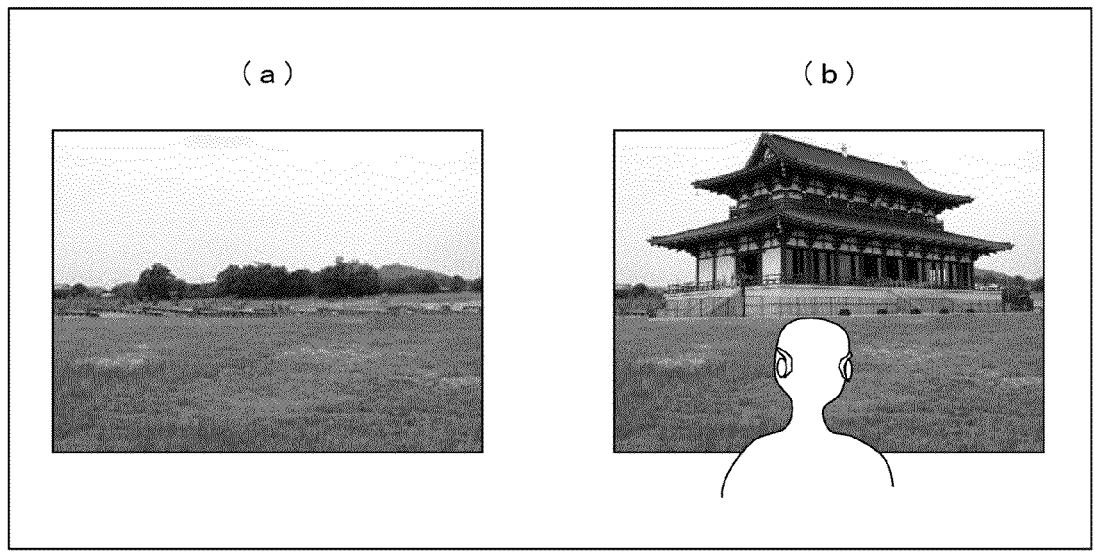
FIG. 13 is a set of diagrams showing examples where an MR mode is achieved through the head-mounted display according to Embodiment 2 of the present invention.

FIG. 13 is a set of diagrams showing examples where an MR mode is realized through the head-mounted display 1*a*.

(a) of FIG. 13 shows a background color image for 3D that is imported from the right-eye and left-eye imaging devices 36 and 37 and perceived by the user of the head-mounted display 1*a*, and this background color image for 3D continuously changes as the user changes his/her posture.

(b) of FIG. 13 shows a case where a virtual shrine, i.e., a content image is superimposed and displayed on this side of the background color image for 3D so that only the content image is preferentially seen.

In the MR mode, as already described above in Embodiment 1, the virtual shrine, i.e., the content image can be displayed as if it were placed in a predetermined location, while the background images continuously changes as the user changes his/her posture.

Therefore, such a mode makes it possible to enjoy virtual content while observing surroundings in real time.

Figure 14:
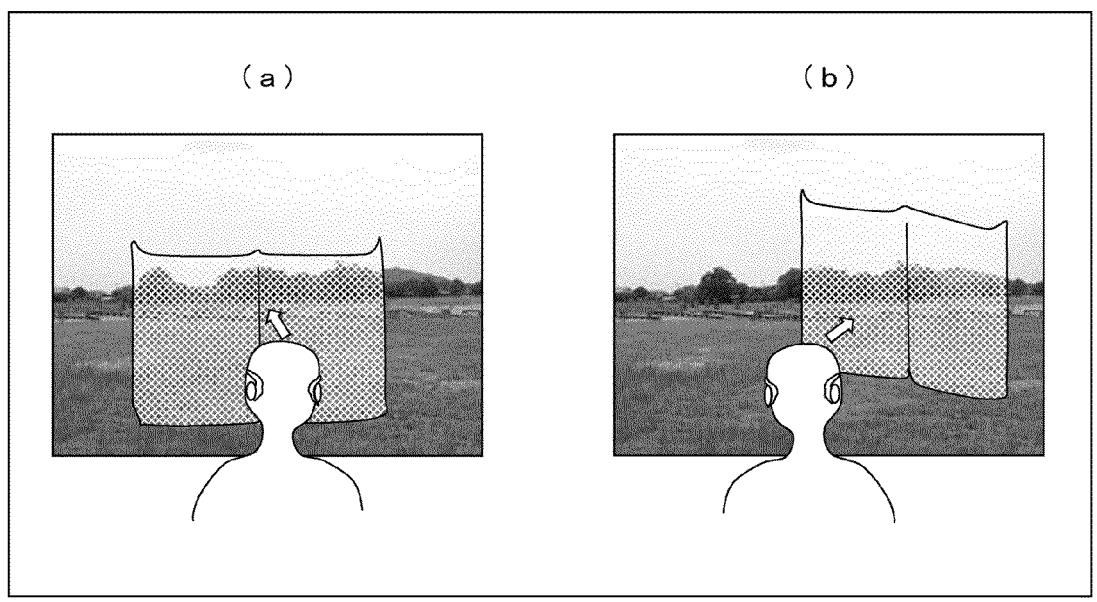
FIG. 14 is a set of diagrams showing examples where a tool-mounted mode is achieved through the head-mounted display according to Embodiment 2 of the present invention.

Meanwhile, FIG. 14 is a set of diagrams showing examples where a tool-mounted mode is realized through the head-mounted display 1*a*.

As shown in (a) and (b) of FIG. 14, although the user of the head-mounted display 1*a* always perceives the same background image even when he/she changes his/her posture, the virtual book, i.e., the content image follows as much as the user changed his/her posture.

In (a) and (b) of FIG. 14, which show a case where the content image is transparently superimposed on this side of the background image, that portion of the background image which is behind the content image can be seen to a certain extent through the content image.

The head-mounted display 1*a* allows the user to choose between the MR mode and the tool-mounted mode, and is therefore user-friendly.

(Phase-Limited Correlation Method)

A phase-limited correction method that is used in the present embodiment for computing more accurate depth information from a right-eye image imported from the right-eye imaging device 36 and a left-eye image imported from the left-eye imaging device 37 is described below with reference to FIGS. 15 through 20.

It should be noted that the present embodiment may of course employ another correlation method instead of the phase-limited correlation method for computing more accurate depth information.

Figure 15:
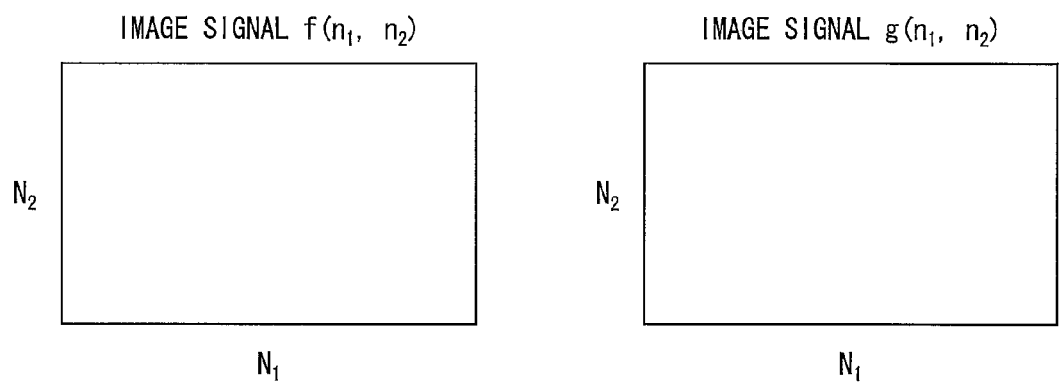
FIG. 15 is a diagram showing the dimensions of a right-eye and left-eye color images $f(n_1,n_2)$ and $g(n_1,n_2)$ imported from right-eye and left-eye imaging devices, respectively, of the head-mounted display according to Embodiment 2 of the present invention.

FIG. 15 is a diagram showing the dimensions of a right-eye color image $f(n_1,n_2)$ imported from the right-eye imaging device 36 and a left-eye color image $g(n_1,n_2)$ imported from the left-eye imaging device 37 in an identical frame.

The right-eye color image $f(n_1,n_2)$ and the left-eye color image $g(n_1,n_2)$ are identical images shifted slightly from each other, and their dimensions are represented by $N_1 \times N_2$ as shown in FIG. 15.

Assuming, for convenience of formulation, that the indices of discrete space are $n1=-M_1, \ldots, M_1$ and $n2=-M_2, \ldots, M_2$ and the dimensions of the image are $N_1=2M_1+1$ and $N_2=2M_2+1$, $F(k_1,k_2)$ and $G(k_1,k_2)$ obtained by subjecting the image $f(n_1,n_2)$ and the image $g(n_1,n_2)$ to two-dimensional discrete Fourier transform can be obtained by Expressions (12) and (13) as follows:

[Math. 12]

$$F(k_1, k_2) = \sum_{n_1 n_2} f(n_1, n_2) W_{N_1}^{k_1 n_1} W_{N_2}^{k_2 n_2} \quad (12)$$
$$= A f(k_1, k_2) e^{j\theta f(k_1, k_2)}$$

[Math. 13]

$$G(k_1, k_2) = \sum_{n_1 n_2} g(n_1, n_2) W_{N_1}^{k_1 n_1} W_{N_2}^{k_2 n_2} \quad (13)$$
$$= A g(k_1, k_2) e^{j\theta g(k_1, k_2)}$$

In Expressions (12) and (13), $k_1=-M_1, \ldots, M_1$, $_2=-M_2, \ldots, M_2$, $W_{N1}=e^{-j2\pi/N1}$, and $W_{N2}=e^{-j2\pi/N2}$.

In Expression (12), $A_F(k_1,k_2)$ is the amplitude component of the image $f(n_1,n_2)$ and $e^{j\theta f(k1,k2)}$ is the phase component of the signal. In Expression (13), $AG(k_1,k_2)$ is the amplitude component of the image $g(n_1,n_2)$ and $e^{j\theta g(k1,k2)}$ is the phase component of the signal.

Then, the correlation value $R(k_1,k_2)$ normalized by an absolute value at each frequency of the Fourier transform of each of the images is defined by Expression (14) as follows:

[Math. 14]

$$R(k_1, k_2) = \frac{F(k_1, k_2) * \overline{G(k_1, k_2)}}{|F(k_1, k_2) * \overline{G(k_1, k_2)}|} \quad (14)$$
$$= e^{j(\theta f(k_1, k_2) - \theta g(k_1, k_2))}$$

According to Expression (14), the correlation value is always 1 (perfect correlation) is achieved in a case where the image $f(n_1, n_2)$ and the image $g(n_1, n_2)$ are identical.

Inverse Fourier transform of Expression (14) gives a phase-limited correlation function $r(n_1, n_2)$ represented by Expression (15) as follows:

[Math. 15]

$$r(n_1, n_2) = \frac{1}{N_1 N_2} \sum_{k_1 k_2} R(k_1, k_2) W_{N_1}^{-k_1 n_1} W_{N_2}^{-k_2 n_2} \quad (15)$$

Meanwhile, in the case of an image defined by continuous space, a phase-limited correlation function can be obtained in the following way.

In a case where an original image defined by continuous space is represented by $Sc(x_1, x_2)$, an image obtained by shifting the original image $Sc(x_1, x_2)$ by $\delta_1$ and $\delta_2$ in the continuous space is represented by $Sc(x_1-\delta_1, x_2-\delta_2)$.

Assuming a discrete sample of the original image as a right-eye color image $f(n_1, n_2)$ imported from the right-eye imaging device 36 and the image obtained by shifting the original image as a left-eye color image $g(n_1, n_2)$ imported from the left-eye imaging device 37, the image $f(n_1, n_2)$ and the image $g(n_1, n_2)$ are defined by Expressions (16) and (17), respectively, as follows:

[Math. 16]

$$f(n_1, n_2) = Sc(x_1, x_2)|_{x_1 = n_1 T_1, x_2 = n_2 T_2} \quad (16)$$

[Math. 17]

$$g(n_1, n_2) = Sc(x_1-\delta_1, x_2-\delta_2)|_{x_1 = n_1 T_1, x_2 = n_2 T_2} \quad (17)$$

At this point, the phase-limited correlation function is represented by Expression (18) as follows:

[Math. 18]

$$r(n_1, n_2) \approx \frac{\alpha}{N_1 N_2} \frac{\text{Sin}\{\pi(n_1 + \delta_1)\} \text{Sin}\{\pi(n_2 + \delta_2)\}}{\text{Sin}\{\frac{\pi}{N_1}(n_1 + \delta_1)\} \text{Sin}\{\frac{\pi}{N_2}(n_2 + \delta_2)\}} \quad (18)$$

According to the phase-limited correlation method in Expression (18), $1 \leq \alpha$ due to a band limitation.

Further, in a case where the image size $N_1, N_2$ is sufficiently large, the phase-limited correlation function can be approximated by Expression (19) as follows:

[Math. 19]

$$r(n_1, n_2) \approx \alpha \frac{\text{Sin}\{\pi(n_1 + \delta_1)\} \text{Sin}\{\pi(n_2 + \delta_2)\}}{\pi(n_1 + \delta_1) \pi(n_2 + \delta_2)} \quad (19)$$

The images $F(k_1, k_2)$ and $G(k_1, k_2)$ obtained by subjecting the image $f(n_1, n_2)$ and the image $g(n_1, n_2)$ to two-dimensional discrete Fourier transform become discontinuous at image edges to suffer from aliasing, as it is assumed that the images circulate.

Therefore, in the present embodiment, the effect of the aliasing is diminished by multiplying the image $f(n_1, n_2)$ and the image $g(n_1, n_2)$ by such a Hanning window as that shown in Expression (20) as follows:

[Math. 20]

$$w(n_1, n_2) = \frac{1 + \text{Cos}\left(\frac{\pi n_1}{M_1}\right)}{2} \frac{1 + \text{Cos}\left(\frac{\pi n_2}{M_2}\right)}{2} \quad (20)$$

Figure 16:
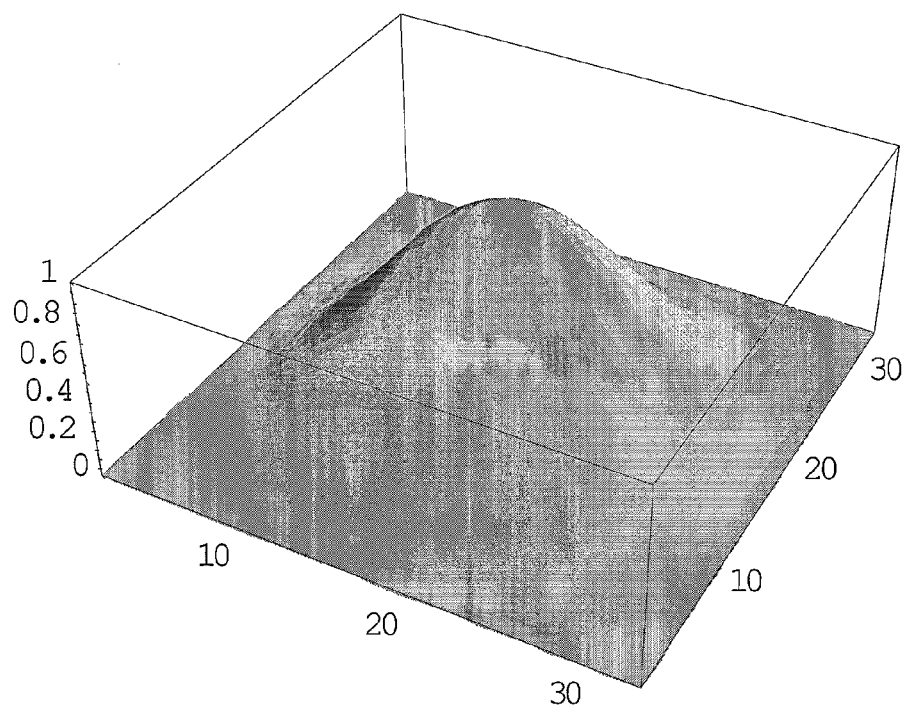
FIG. 16 is a diagram showing an example of a Hanning window that is used in performing image matching based on a phase-limited correlation method through the head-mounted display according to Embodiment 2 of the present invention.

FIG. 16 shows an example of a Hanning window that is used in performing image matching based on a phase-limited correlation method, i.e., a space filer for diminishing the effect of aliasing.

FIG. 16 is a visualization of Expression (20), and its offset is such that (0,0) corresponds to (16,16).

Since a natural image taken by a camera such as the right-eye and left-eye imaging devices 36 and 37 is predicted to be lower in S/N ratio in a high-frequency region than in a low-frequency region, the present embodiment achieves higher accuracy by removing a lowly reliable high-frequency component by using a square low-pass filter as a weighting function.

As represented by Expression (21), the square low-pass filter $H(k_1, k_2)$ as a weighting function is 1 when $k_1$ is 0 to $U_1$ and $k_2$ is 0 to $U_2$, and is 0 otherwise.

It should be noted that $U_1$ and $U_2$ are integers that satisfy $0 \leq U_1 \leq M_1$ and $0 \leq U_2 \leq M_2$, respectively.

[Math. 21]

$$H(k_1, k_2) = \begin{cases} 1: & 0 \leq k_1 \leq U_1, 0 \leq k_2 \leq U_2 \\ 0: & \text{Otherwise} \end{cases} \quad (21)$$

Then, applying the square low-pass filter $H(k_1, k_2)$ to Expression (19) gives Expression (22) as follows:

[Math. 22]

$$r(n_1, n_2) \approx \alpha \frac{\text{Sin}\left\{\frac{V_1}{N_1} \pi(n_1 + \delta_1)\right\} \text{Sin}\left\{\frac{V_2}{N_2} \pi(n_2 + \delta_2)\right\}}{\pi(n_1 + \delta_1) \pi(n_2 + \delta_2)} \quad (22)$$

where $V_1 = 2U_1 + 1$ and $V_2 = 2U_2 + 1$.

Figure 17:
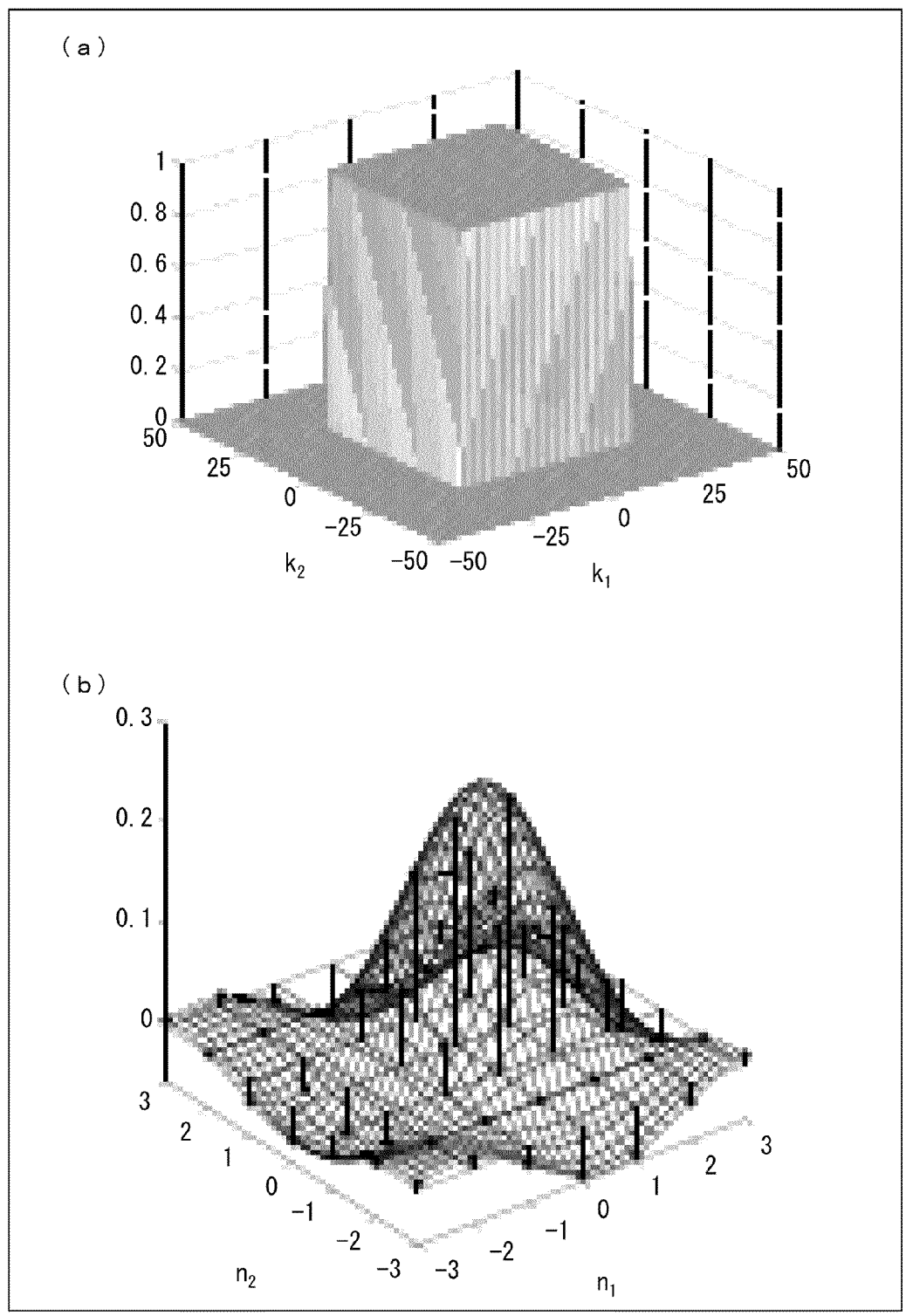
FIG. 17 is a set of diagrams showing a spectrum of a square low-pass filter $H(k_1,k_2)$ as a weighting function that can be used in the head-mounted display according to Embodiment 2 of the present invention and a phase-limited correlation function corresponding to the spectrum.

(a) of FIG. 17 shows a spectrum of a square low-pass filter $H(k_1, k_2)$ as a weighting function, and (b) of FIG. 17 shows a phase-limited correlation function corresponding to the spectrum.

Then, rewriting the phase-limited correlation function of Expression (22) into an evaluation formula (peak evaluation formula: PEF) based on a one-dimensional correlation peak model gives Expression (23) as follows:

[Math. 23]

$$r(n) \approx \alpha \frac{\text{Sin}\left\{\frac{V_1}{N_1} \pi(n + \delta)\right\}}{\pi(n + \delta)} \quad (23)$$

Figure 18:
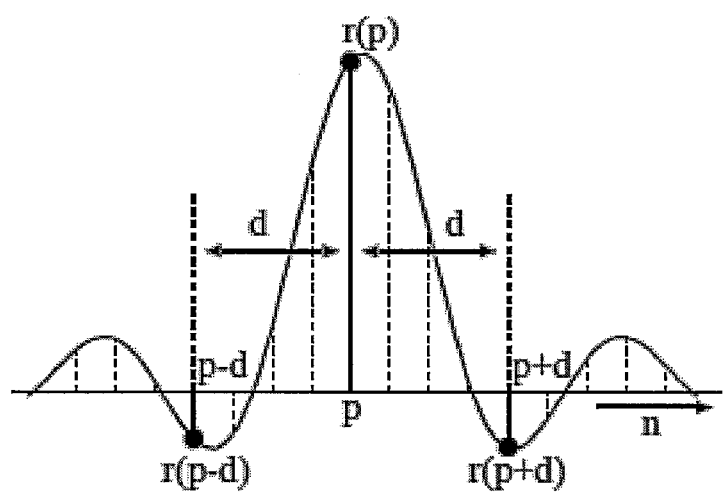
FIG. 18 is a diagram showing a relationship between a phase-limited correlation function and coordinate points that can be used in the head-mounted display according to Embodiment 2 of the present invention.

FIG. 18 is a diagram showing a relationship between the phase-limited correlation function of Expression (23) and coordinate points.

As illustrated in FIG. 18, with attention focused on the point n=p and consideration given to the points n=p+d and n=p−d that is away from the point p by ±d (where d is a natural number), the relationship among the values r(n−d), r(n), and r(n+d) of the phase-limited correlation function at these three points is represented by Expression (24) as follows:

[Math. 24]

$$(p - d + \delta) \cdot r(p - d) + (p + d + \delta) \cdot r(p + d) = \qquad (24)$$
$$2(p + \delta) \cdot \cos\left(\frac{\pi}{N}d\right) \cdot r(p)$$

Then, the amount of shift of subpixels δ is represented by Expression (25) as follows:

[Math. 25]

$$\delta = v(p, d)/u(p, d) \qquad (25)$$
where
$$u(p, d) = r(p - d) + r(p + d) - 2\cos\left(\frac{\pi}{N}d\right) \cdot r(p)$$
$$v(p, d) = 2\cos\left(\frac{\pi}{N}d\right) \cdot r(p) - (p - d) \cdot r(p - d) - (p + d) \cdot r(p + d)$$

A method for computing a peak position from plural sets (I sets) of three points according to the method of least squares is described below.

L equations are obtained, assuming that the I sets of three points are represented by Expression (26) as follows:

[Math. 26]

$$(pi-di, pi, pi+di)(i=1,2,3\ldots I) \qquad (26)$$

Then, an optimum value of the amount of shift of subpixels δ represented by Expression (27) below is obtained by simply by minimizing the square error represented by Expression (28) below.

[Math. 27]

$$\delta = v(pi, di)/u(pi, di) \qquad (27)$$

[Math. 28]

$$J = \sum_{i=1}^{I} |v(pi, di) - \delta u(pi, di)| \qquad (28)$$

Figure 19:
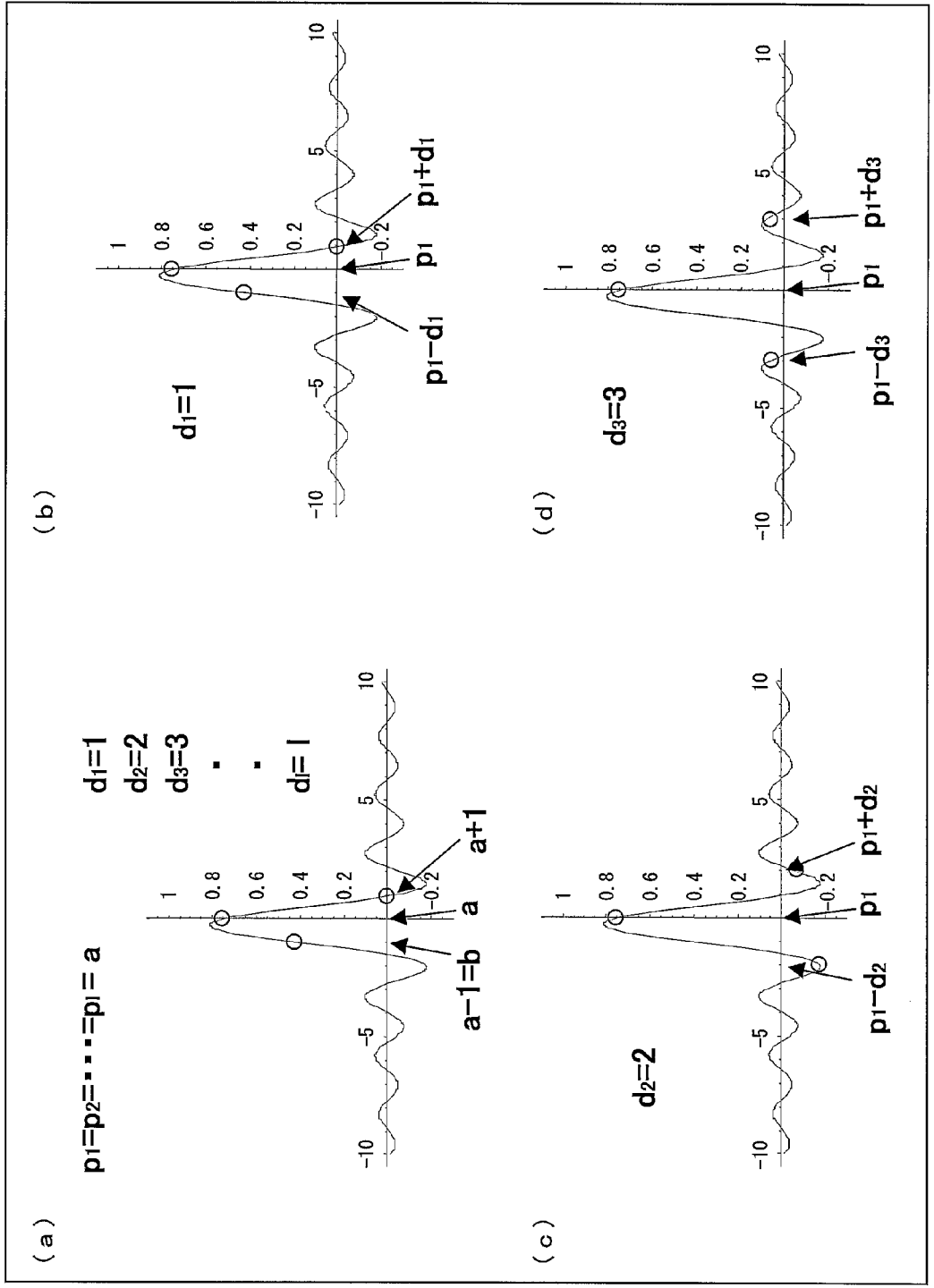
FIG. 19 is a set of diagrams showing a method for estimating an amount of shift of subpixels δ from the center of the first peak of a phase-limited correlation function that can be used in the head-mounted display according to Embodiment 2 of the present invention.
Figure 20:
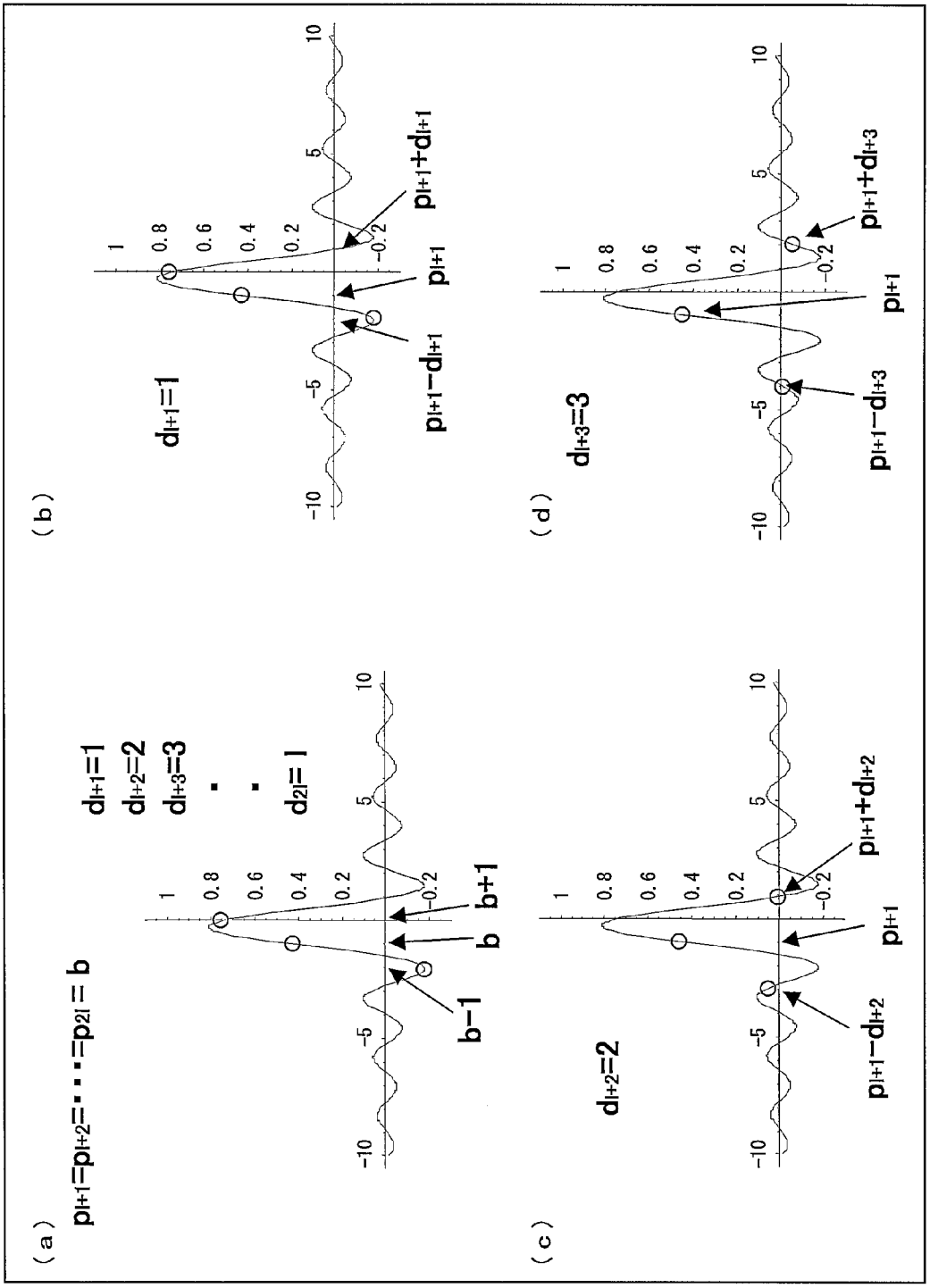
FIG. 20 is a set of diagrams showing a method for estimating an amount shift of subpixels δ from the center of the second peak of the phase-limited correlation function shown in FIG. 19.
Figure 21:
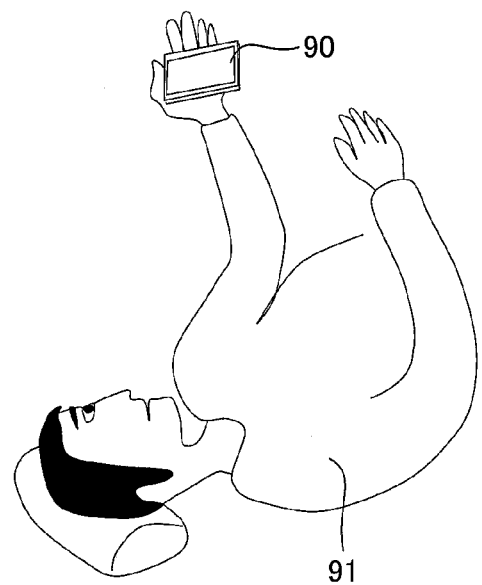
FIG. 21 is a diagram showing how a conventional portable terminal is used.
Figure 22:
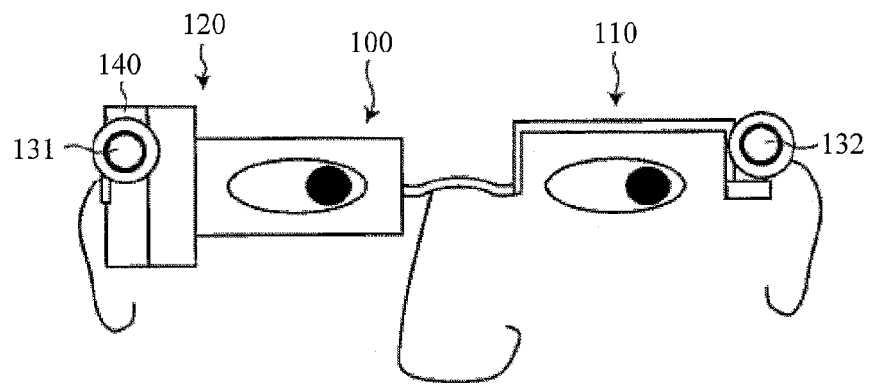
FIG. 22 is a diagram schematically showing a configuration of a conventional head-mounted display.
Figure 22:
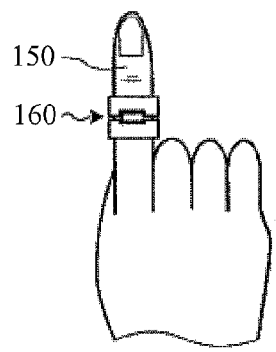
Figure 23:
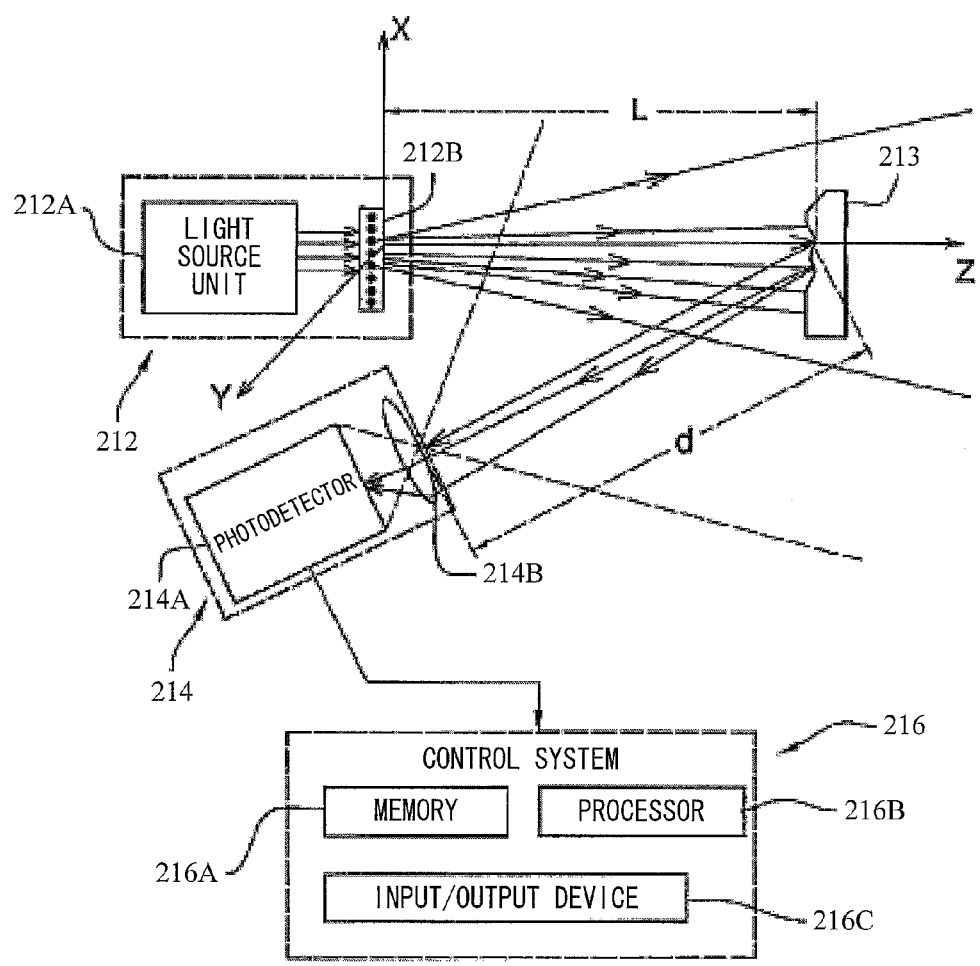
FIG. 23 is a diagram schematically showing a configuration of a conventional optical mapping system.

Varying Expression (28) with δ and setting 0 gives Expression (29) as follows:

[Math. 29]

$$\delta = (U^T U)^{-1} U^T V \qquad (29)$$

where
$U = [u(p1,d1), u(p2,d2), u(p3,d3) \ldots u(pI,dI)]^T$
$V = [v(p1,d1), v(p2,d2), v(p3,d3) \ldots v(pI,dI)]$ (a) through (d) of FIG. 19 are diagrams showing a method for estimating an amount of shift of subpixels δ from the center of the first peak of the phase-limited correlation function, and (a) through (d) FIG. 20 are diagrams showing a method for estimating an amount shift of subpixels δ from the center of the second peak of the phase-limited correlation function.

A method for estimating an amount of shift of subpixels δ in the control unit 7a in the present embodiment is described in detail below.

In the present embodiment, the CPU 28 of the control unit 7a generates an image $fw(n_1,n_2)$ and an image $gw(n_1,n_2)$ by multiplying the images $f(n_1,n_2)$ ad the $g(n_1,n_2)$, which have been slightly shifted, by the Hanning window function represented by Expression (20).

Then, $F(k_1,k_2)$ represented by Expression (12) and $G(k_1,k_2)$ represented by Expression (13) are obtained by subjecting the image $fw(n_1,n_2)$ and the image $gw(n_1,n_2)$ to Fourier transform, respectively.

After that, $R(k_1,k_2)$ is generated according to Expression (14) by normalizing the absolute value of a coefficient of $F(k_1,k_2)$ and $G(k_1,k_2)$.

Then, a phase-limited correlation function $r(n_1,n_2)$ is obtained by subjecting $R(n_1,n_2)$ to inverse Fourier transform, and as shown in FIG. 19, the position of the first peak of the phase-limited correlation function $r(n_1,n_2)$ is found and associated with $p_1$, and as shown in FIG. 20, the position of the second peak of the phase-limited correlation function $r(n_1,n_2)$ is found and associated with $p_{i+1}$.

After that, assuming that $d_1, d_2, d_3 \ldots, d_1$ in FIG. 19 and $d_{1+2}, d_{1+2}, d_{1+3} \ldots, d_{21}$ in FIG. 20 are 1, 2, 3, ... 1, respectively, a total of 21 $u(p_i,d_i)$ and $v(p_i,d_i)$ are obtained according to Expression (25).

Finally, depth information is computed by defining the U and V vectors and obtaining the amount of shift of subpixels δ according to Expression (29).

The head-mounted display of the present invention is preferably configured such that the control section identifies a type of input operation in accordance with a change in the coordinate values of the object to be detected during a predetermined period of time during which the coordinate value of the object to be detected as measured along the line parallel to the third axis is less than a predetermined value.

According to the foregoing configuration, the object to be detected whose coordinate value as measured along the line parallel to the third axis is less than the predetermined value, i.e., the object to be detected located at a comparatively short distance from the head-mounted display is judged to be an object to be detected by which an input operation is performed, and the type of input operation is identified in accordance with a change in the coordinate values of such an object to be detected during a predetermined period of time.

This makes it possible to achieve a head-mounted display through which an input operation can be performed.

The head-mounted display of the present invention is preferably configured such that: the object to be detected whose coordinate value as measured along the line parallel to the third axis is less than the predetermined value is a finger of the user; and coordinate values of the finger are coordinate values of a fingertip in an image obtained by fitting a skeletal image of the finger to an image representing a profile line of the finger as created in accordance with a predetermined pattern of reflection from the finger.

The foregoing configuration allows the user to perform a highly accurate input operation with his/her finger(s) without using any special input means.

The head-mounted display of the present invention is preferably configured such that: the control section causes the display section to display, as a background image, an image representing a profile line of the object to be detected as created in accordance with a predetermined pattern of reflection as obtained by the infrared light detection section during a first period of time from the object to be detected whose coordinate value as measured along the line parallel to the third axis is equal to or greater than a/the predetermined value; and the control section computes an amount of posture change in the user from the predetermined pattern of reflection as obtained by the infrared light detection section during the first period of time and a predetermined pattern of reflection from the object to be detected as obtained during a second period of time that lags the first period of time by a predetermined period of time, and causes the display section to display a content image with the content image shifted by the amount of posture change.

According to the foregoing configuration, the object to be detected whose coordinate value as measured along the line parallel to the third axis by the infrared light detection section during the first period of time is equal to or greater than the predetermined value, i.e., the object to be detected located at a comparatively long distance from the head-mounted display is recognized as a background.

Moreover, the display section always displays, as a background image, an image representing a profile line of the object to be detected as created in accordance with a predetermined pattern of reflection as obtained by the infrared light detection section during the first period of time from the object to be detected whose coordinate value as measured along the line parallel to the third axis is equal to or greater than the predetermined value.

Therefore, even when the user changes his/her posture, for example, by moving his/her head, the user can always view the same background image.

Moreover, an amount of posture change in the user can be computed from the predetermined pattern of reflection as obtained by the infrared light detection section during the first period of time and a predetermined pattern of reflection from the object to be detected as obtained during a second period of time that lags the first period of time by a predetermined period of time, and the display section can display a content image with the content image shifted by the amount of posture change.

The foregoing configuration makes it possible to achieve a mode in which the display section always displays the same background image even when the user changes his/her posture and the display section displays a content image with the content image shifted in position in accordance with an amount of posture change in the user.

The head-mounted display of the present invention is preferably configured such that: the control section causes the display section to sequentially display, as a background image, an image representing a profile line of the object to be detected as created in accordance with a predetermined pattern of reflection as obtained by the infrared light detection section from the object to be detected whose coordinate value as measured along the line parallel to the third axis is equal to or greater than a/the predetermined value; and the control section computes an amount of posture change in the user from a predetermined pattern of reflection as obtained by the infrared light detection section during a first period of time and a predetermined pattern of reflection from the object to be detected as obtained during a second period of time that lags the first period of time by a predetermined period of time, and causes the display section to display a content image with the content image shifted by an amount of change in a direction opposite to the amount of posture change.

In a case where the user is not wearing the head-mounted display, the user sees the background continuously changing as he/she changes his/her posture.

The foregoing configuration allows the user, even when he/she is wearing the head-mounted display, to see the background continuously changing on the display section as he/she changes his/her posture, as if he/she were not wearing the head-mounted display.

Meanwhile, since the display section displays a content image with the content image shifted by an amount of change in a direction opposite to the amount of posture change in the user, the content image can be fixed in a predetermined location on the continuously-changing background image.

The foregoing configuration makes it possible to achieve a mode in which the content image is displayed in a predetermined location on a background image that continuously changes as the user changes his/her posture.

The head-mounted display of the present invention is preferably configured such that: the display section includes a left-eye image display section that displays a left-eye image and a right-eye image display section that displays a right-eye image; the mounting section includes a left-eye imaging device that captures a left-eye image of the background image and a right-eye imaging device that captures a right-eye image of the background image, the left-eye imaging device and the right-eye imaging device being placed at a predetermined distance from each other; and the control section causes the left-eye and right-eye image display devices to alternately display left-eye and right-eye images, respectively, of the background image and the content image at predetermined intervals.

The foregoing configuration allows the user to perceive the background image and the content image as a stereoscopic image with a sense of depth, thus making it possible to achieve a head-mounted display with a further increased sense of reality.

The head-mounted display of the present invention is preferably configured such that: the control section obtains depth information from left-eye and right-eye images of the background image according to a correlation method and combines the background image and the content image with each other in accordance with the depth information.

The head-mounted display of the present invention is preferably configured such that the correlation method is a phase-limited correlation method.

The foregoing configuration makes it possible, for example, to generate a combination of the background image and the content image in accordance with depth information on the background image as obtained by using a correlation method such as a phase-limited correlation method, thus making it possible to achieve a head-mounted display with an increased sense of reality.

Further, in a case where a phase-limited correlation method is used as the correlation method, more highly accurate depth information can be obtained.

The head-mounted display of the present invention is preferably configured such that the background image and the content image are combined with each other so that the user is able to see the background image through the content image.

The foregoing configuration allows the user to see the background image through the content image and therefore allows the user to enjoy the content image and the background image at the same time.

The head-mounted display of the present invention is preferably configured such that the left-eye and right-eye imaging devices are color imaging devices that are capable of capturing color images.

The foregoing configuration makes it possible to achieve a head-mounted display with a further increased sense of reality.

The head-mounted display of the present invention is preferably configured such that the control section (i) selects, in accordance with a change in the coordinate values of the object to be detected, as measured along the lines parallel to the first and second axes during a predetermined period of time during which the coordinate value of the object to be detected as measured along the line parallel to the third axis is less than the predetermined value, which one of the following operations to perform, namely an operation of scaling up a content image that is displayed on the display section, an operation of scaling down the content image, an operation of moving the content image, and an operation of transforming the content image, (ii) determines, in accordance with a change in the coordinate value of the object to be detected as measured along the line parallel to the third axis during the predetermined period of time, whether or not the object to be detected has touched the content image, and (iii), if having determined that the object to be detected has touched the content image, causes the content image to be displayed on the display section after having performed the operation on the content image.

According to the foregoing configuration, the control section (i) determines, in accordance with a change in the coordinate values of the object to be detected, as measured along the lines parallel to the first and second axes during a predetermined period of time during which the coordinate value of the object to be detected as measured along the line parallel to the third axis is less than the predetermined value, a type of operation, for example, to scale up, scale down, moving, or transforming a content image that is displayed on the display section and (ii) determines, in accordance with a change in the coordinate value of the object to be detected as measured along the line parallel to the third axis during the predetermined period of time, whether or not to perform the operation on the content image that is displayed on the display section.

This makes it possible to achieve a head-mounted display through which a comparatively highly accurate input operation can be performed.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable to head-mounted displays etc.

REFERENCE SIGNS LIST 1, 1a Head-mounted display
2 Mounting section
3 Right-eye image display section
4 Left-eye image display section
5 Infrared light irradiation section
6 Infrared light detection section
7 Control unit (control section)
8 Right-ear earphone
9 Left-ear earphone
10a, 10b White LED
11a, 11b Condensing lens
12a, 12b Liquid crystal display panel
13a, 13b Prism
14a, 14b Lens
15 Infrared light LED
16 Diffusing plate
17 Microlens array section
18 Projecting lens
19 CCD
20 Condensing lens
23, 31 Memory
24 Depth information decompression section
25 LED drive circuit
26 CPU
27 GPU
28 3D memory
29, 29a, 30, 30a Display controller
32 SW section
33 Communication section
34 Audio section
35 Power supply section
36 Right-eye imaging device
37 Left-eye imaging device
38 Software storage section

The invention claimed is:

1. A head-mounted display, including a display section that allows an user to view an image, which is capable of computing three-dimensional coordinates of an object to be detected, comprising:
   a mounting section for the user to mount on his/her head, the mounting section including an infrared light irradiation section that irradiates the object to be detected with a predetermined pattern of infrared light and an infrared light detection section that detects the infrared light reflected by the object to be detected, the infrared light irradiation section and the infrared light detection section being placed at a predetermined distance from each other; and
   a control section including a computing section that computes the three-dimensional coordinates,
   the computing section computing, from a predetermined pattern of reflection from the object to be detected as obtained by the infrared light detection section, coordinate values of the object to be detected as measured along lines parallel to first and second axes that are orthogonal to each other, and computing, from an amount of shift between a predetermined pattern with which the object to be detected is irradiated and the predetermined pattern of reflection from the object to be detected as obtained by the infrared light detection section, a coordinate value of the object to be detected as measured along a line parallel to a third axis that is orthogonal to the first and second axes and parallel to a line of sight of the user.

2. The head-mounted display as set forth in claim 1, wherein the control section identifies a type of input operation in accordance with a change in the coordinate values of the object to be detected during a predetermined period of time during which the coordinate value of the object to be detected as measured along the line parallel to the third axis is less than a predetermined value.

3. The head-mounted display as set forth in claim 2, wherein:
   the object to be detected whose coordinate value as measured along the line parallel to the third axis is less than the predetermined value is a finger of the user; and
   coordinate values of the finger are coordinate values of a fingertip in an image obtained by fitting a skeletal image of the finger to an image representing a profile line of the finger as created in accordance with a predetermined pattern of reflection from the finger.

4. The head-mounted display as set forth in claim 2, wherein the control section (i) selects, in accordance with a change in the coordinate values of the object to be detected, as measured along the lines parallel to the first and second axes during a predetermined period of time during which the coordinate value of the object to be detected as measured along the line parallel to the third axis is less than the predetermined value, which one of the following operations to perform, namely an operation of scaling up a content image that is displayed on the display section, an operation of scaling down the content image, an operation of moving the content image, and an operation of transforming the content image, (ii) determines, in accordance with a change in the coordinate value of the object to be detected as measured along the line parallel to the third axis during the predetermined period of time, whether or not the object to be detected has touched the content image, and (iii), if having determined that the object to be detected has touched the content image, causes the content image to be displayed on the display section after having performed the operation on the content image.

5. The head-mounted display as set forth in claim 1, wherein:
the control section causes the display section to display, as a background image, an image representing a profile line of the object to be detected as created in accordance with a predetermined pattern of reflection as obtained by the infrared light detection section during a first period of time from the object to be detected whose coordinate value as measured along the line parallel to the third axis is equal to or greater than a predetermined value; and
the control section computes an amount of posture change in the user from the predetermined pattern of reflection as obtained by the infrared light detection section during the first period of time and a predetermined pattern of reflection from the object to be detected as obtained during a second period of time that lags the first period of time by a predetermined period of time, and causes the display section to display a content image with the content image shifted by the amount of posture change.

6. The head-mounted display as set forth in claim 5, wherein:
the display section includes a left-eye image display section that displays a left-eye image and a right-eye image display section that displays a right-eye image;
the mounting section includes a left-eye imaging device that captures a left-eye image of the background image and a right-eye imaging device that captures a right-eye image of the background image, the left-eye imaging device and the right-eye imaging device being placed at a predetermined distance from each other; and
the control section causes the left-eye and right-eye image display devices to alternately display left-eye and right-eye images, respectively, of the background image and the content image at predetermined intervals.

7. The head-mounted display as set forth in claim 6, wherein the control section obtains depth information from left-eye and right-eye images of the background image according to a correlation method and combines the background image and the content image with each other in accordance with the depth information.

8. The head-mounted display as set forth in claim 7, wherein the correlation method is a phase-limited correlation method.

9. The head-mounted display as set forth in claim 7, wherein the background image and the content image are combined with each other so that the user is able to see the background image through the content image.

10. The head-mounted display as set forth in claim 6, wherein the left-eye and right-eye imaging devices are color imaging devices that are capable of capturing color images.

11. The head-mounted display as set forth in claim 1, wherein:
the control section causes the display section to sequentially display, as a background image, an image representing a profile line of the object to be detected as created in accordance with a predetermined pattern of reflection as obtained by the infrared light detection section from the object to be detected whose coordinate value as measured along the line parallel to the third axis is equal to or greater than a predetermined value; and
the control section computes an amount of posture change in the user from a predetermined pattern of reflection as obtained by the infrared light detection section during a first period of time and a predetermined pattern of reflection from the object to be detected as obtained during a second period of time that lags the first period of time by a predetermined period of time, and causes the display section to display a content image with the content image shifted by an amount of change in a direction opposite to the amount of posture change.

* * * * *